(12) United States Patent
Thakker et al.

(10) Patent No.: US 8,301,720 B1
(45) Date of Patent: Oct. 30, 2012

(54) METHOD AND SYSTEM TO COLLECT AND COMMUNICATE PROBLEM CONTEXT IN XML-BASED DISTRIBUTED APPLICATIONS

(75) Inventors: Anand Thakker, Raleigh, NC (US); Aaron White, Hollis, NH (US); Franklin C. Grossman, Hollis, NH (US); James Murphy, Amherst, NH (US); Mark Ericson, Amherst, NH (US)

(73) Assignee: Progress Software Corporation, Bedford, MA (US)

( * ) Notice: Subject to any disclaimer, the term of this patent is extended or adjusted under 35 U.S.C. 154(b) by 1375 days.

(21) Appl. No.: 11/458,296

(22) Filed: Jul. 18, 2006

Related U.S. Application Data

(60) Provisional application No. 60/700,173, filed on Jul. 18, 2005.

(51) Int. Cl.
*G06F 15/16* (2006.01)
*G06F 15/173* (2006.01)

(52) U.S. Cl. .................. 709/217; 709/224; 709/237

(58) Field of Classification Search .......... 709/203–205, 709/217–219, 223, 224, 237, 249; 703/21, 703/22; 719/315, 316, 328; 714/25, 37, 714/38, 47
See application file for complete search history.

(56) References Cited

U.S. PATENT DOCUMENTS

| | | | |
|---|---|---|---|
| 5,245,616 A | 9/1993 | Olson | |
| 5,392,398 A | 2/1995 | Meyer | |
| 5,596,720 A | 1/1997 | Hamada et al. | |
| 5,758,354 A | 5/1998 | Huang et al. | |
| 5,765,033 A | 6/1998 | Miloslavsky | |
| 5,805,825 A | 9/1998 | Danneels et al. | |
| 5,822,526 A | 10/1998 | Waskiewicz | |
| 5,850,525 A | 12/1998 | Kalkunte et al. | |
| 5,857,201 A | 1/1999 | Wright, Jr. et al. | |
| 5,870,605 A | 2/1999 | Bracho et al. | |
| 5,878,056 A | 3/1999 | Black et al. | |
| 5,951,648 A | 9/1999 | Kailash | |
| 6,016,515 A | 1/2000 | Shaw et al. | |

(Continued)

FOREIGN PATENT DOCUMENTS
EP 1420562 A2 5/2004
(Continued)

OTHER PUBLICATIONS

"Extensible Markup Language (XML) 1.0 (Second Edition)", Oct. 6, 2000, [online] [retrieved on Aug. 3, 2006] Retrieved from the internet <URL:http://www.w3.org/TR/2000/REC-xml-20001006>, pp. 1-43, W3C.

(Continued)

*Primary Examiner* — Lynn Feild
*Assistant Examiner* — Melvin H Pollack
(74) *Attorney, Agent, or Firm* — Wilmer Cutler Pickering Hale & Dorr LLP.

(57) ABSTRACT

A system providing a reproducible package of a web service scenario having at least one web service client and at least one web service coupled to said network. A collector extracts a set of message exchanges between the web service client and the web service, and a closure builder captures a service description. A workspace repository coup stores the set of message exchanges and the service description to create the reproducible package of the web service scenario. According to one embodiment, the reproducible packages provide mechanisms to share and replay XML message-based scenarios for distributed applications.

17 Claims, 13 Drawing Sheets

U.S. PATENT DOCUMENTS

| | | | |
|---|---|---|---|
| 6,061,559 A | 5/2000 | Eriksson et al. | |
| 6,112,323 A | 8/2000 | Meizlik et al. | |
| 6,128,646 A | 10/2000 | Miloslavsky | |
| 6,145,781 A | 11/2000 | Kawabe et al. | |
| 6,167,445 A | 12/2000 | Gai et al. | |
| 6,289,212 B1 | 9/2001 | Stein et al. | |
| 6,298,455 B1 | 10/2001 | Knapman et al. | |
| 6,336,119 B1 | 1/2002 | Banavar et al. | |
| 6,397,352 B1 | 5/2002 | Chandrasekaran et al. | |
| 6,452,934 B1 | 9/2002 | Nakata | |
| 6,453,346 B1 | 9/2002 | Garg et al. | |
| 6,484,198 B1 | 11/2002 | Milovanovic et al. | |
| 6,513,154 B1 | 1/2003 | Porterfield | |
| 6,643,682 B1 | 11/2003 | Todd et al. | |
| 6,647,544 B1 | 11/2003 | Ryman et al. | |
| 6,728,715 B1 | 4/2004 | Astley et al. | |
| 6,732,175 B1 | 5/2004 | Abjanic | |
| 6,782,386 B1 | 8/2004 | Gebauer | |
| 6,792,460 B2 | 9/2004 | Oulu et al. | |
| 6,801,604 B2 | 10/2004 | Maes et al. | |
| 6,807,636 B2 | 10/2004 | Hartman et al. | |
| 6,816,898 B1 | 11/2004 | Scarpelli et al. | |
| 6,898,556 B2 | 5/2005 | Smocha et al. | |
| 6,901,447 B2 | 5/2005 | Koo et al. | |
| 6,944,662 B2 | 9/2005 | Devine et al. | |
| 6,983,479 B1 | 1/2006 | Salas et al. | |
| 7,007,278 B2 | 2/2006 | Gungabeesoon | |
| 7,028,089 B2 | 4/2006 | Agarwalla et al. | |
| 7,039,701 B2* | 5/2006 | Wesley | 709/224 |
| 7,096,263 B2 | 8/2006 | Leighton et al. | |
| 7,103,054 B2 | 9/2006 | Novaes | |
| 7,177,929 B2* | 2/2007 | Burbeck et al. | 709/224 |
| 7,251,689 B2* | 7/2007 | Wesley | 709/224 |
| 7,287,097 B1 | 10/2007 | Friend et al. | |
| 7,302,634 B2* | 11/2007 | Lucovsky et al. | 715/200 |
| 7,334,022 B2 | 2/2008 | Nishimura et al. | |
| 7,359,919 B2* | 4/2008 | Cohen et al. | 707/104.1 |
| 7,379,971 B2 | 5/2008 | Miller et al. | |
| 7,386,630 B2 | 6/2008 | Liong et al. | |
| 7,395,349 B1 | 7/2008 | Szabo et al. | |
| 7,406,440 B2* | 7/2008 | Napier et al. | 705/26 |
| 7,406,537 B2 | 7/2008 | Cullen | |
| 7,418,501 B2* | 8/2008 | Davis et al. | 709/225 |
| 7,433,835 B2* | 10/2008 | Frederick et al. | 705/26 |
| 7,464,154 B2 | 12/2008 | Dick et al. | |
| 7,467,196 B2* | 12/2008 | Di Luoffo et al. | 709/223 |
| 7,487,510 B1* | 2/2009 | Carr | 719/313 |
| 7,496,637 B2* | 2/2009 | Han et al. | 709/217 |
| 7,512,957 B2* | 3/2009 | Cohen et al. | 719/328 |
| 7,516,191 B2* | 4/2009 | Brouk et al. | 709/217 |
| 7,533,172 B2* | 5/2009 | Traversat et al. | 709/225 |
| 7,539,656 B2* | 5/2009 | Fratkina et al. | 706/45 |
| 7,543,280 B2 | 6/2009 | Rosenthal et al. | |
| 7,603,358 B1 | 10/2009 | Anderson et al. | |
| 7,702,636 B1* | 4/2010 | Sholtis et al. | 707/999.1 |
| 7,752,604 B2* | 7/2010 | Genkin et al. | 717/125 |
| 7,801,946 B2* | 9/2010 | Bearman | 709/203 |
| 7,801,976 B2* | 9/2010 | Hodges et al. | 709/223 |
| 7,881,992 B1* | 2/2011 | Seaman et al. | 705/35 |
| 7,887,511 B2* | 2/2011 | Mernoe et al. | 604/131 |
| 7,895,262 B2* | 2/2011 | Nielsen et al. | 709/203 |
| 7,941,542 B2* | 5/2011 | Broda et al. | 709/227 |
| 8,001,232 B1* | 8/2011 | Saulpaugh et al. | 709/224 |
| 8,060,553 B2* | 11/2011 | Mamou et al. | 709/203 |
| 2001/0007993 A1 | 7/2001 | Wu | |
| 2002/0010781 A1 | 1/2002 | Tuatini | |
| 2002/0026473 A1 | 2/2002 | Gourraud | |
| 2002/0107992 A1 | 8/2002 | Osbourne et al. | |
| 2002/0161826 A1 | 10/2002 | Arteaga et al. | |
| 2003/0005174 A1 | 1/2003 | Coffman et al. | |
| 2003/0014733 A1 | 1/2003 | Ringseth et al. | |
| 2003/0041178 A1 | 2/2003 | Brouk et al. | |
| 2003/0055920 A1 | 3/2003 | Kakadia et al. | |
| 2003/0061404 A1 | 3/2003 | Atwal et al. | |
| 2003/0074579 A1 | 4/2003 | Della-Libera et al. | |
| 2003/0093500 A1* | 5/2003 | Khodabakchian et al. | 709/219 |
| 2003/0101210 A1 | 5/2003 | Goodman et al. | |
| 2003/0120665 A1 | 6/2003 | Fox et al. | |
| 2003/0145281 A1 | 7/2003 | Thames et al. | |
| 2003/0204644 A1 | 10/2003 | Vincent | |
| 2004/0030947 A1 | 2/2004 | Aghili et al. | |
| 2004/0088140 A1 | 5/2004 | O'Konski et al. | |
| 2004/0133633 A1* | 7/2004 | Fearnley et al. | 709/203 |
| 2004/0186817 A1 | 9/2004 | Thames et al. | |
| 2004/0193703 A1 | 9/2004 | Loewy et al. | |
| 2004/0216127 A1 | 10/2004 | Datta et al. | |
| 2004/0225724 A1* | 11/2004 | Pavlik et al. | 709/219 |
| 2005/0027853 A1* | 2/2005 | Martin et al. | 709/224 |
| 2005/0038708 A1 | 2/2005 | Wu | |
| 2006/0031481 A1* | 2/2006 | Patrick et al. | 709/224 |
| 2006/0173985 A1 | 8/2006 | Moore | |
| 2006/0195819 A1 | 8/2006 | Chory et al. | |
| 2006/0206440 A1 | 9/2006 | Anderson et al. | |
| 2006/0224702 A1* | 10/2006 | Schmidt et al. | 709/219 |
| 2006/0224750 A1 | 10/2006 | Davies et al. | |
| 2006/0230432 A1 | 10/2006 | Lee et al. | |
| 2007/0174393 A1 | 7/2007 | Bosschaert et al. | |
| 2008/0059220 A1 | 3/2008 | Roth et al. | |
| 2008/0148346 A1 | 6/2008 | Gill et al. | |
| 2008/0172270 A1 | 7/2008 | Eckenroth | |
| 2009/0319832 A1 | 12/2009 | Zhang et al. | |
| 2009/0326997 A1 | 12/2009 | Becker et al. | |
| 2010/0007853 A1 | 1/2010 | Nakai | |
| 2010/0017853 A1 | 1/2010 | Readshaw | |
| 2010/0030718 A1 | 2/2010 | Anderson et al. | |
| 2010/0304992 A1 | 12/2010 | An et al. | |

FOREIGN PATENT DOCUMENTS

| | | |
|---|---|---|
| EP | 1420562 A2 | 5/2004 |
| WO | 9922288 | 5/1999 |
| WO | WO-9922288 A2 | 5/1999 |

OTHER PUBLICATIONS

"Interoperability: the Key to Quality Web Services", Mar. 2004, [online] [retrieved on Nov. 17, 2004], Retrieved from the internet <URL:http://www.mindreef.com/products/whitepapers/whitepaper-2.html>, pp. 1-9, Mindreef, Inc.

Mitchko, Joe, "Mindreef SOAPscope 1.0", [online] [retrieved on Sep. 27, 2004], Retrieved from the internet <URL:http://www.syscon.com/webservices/articleprint.cfm?id+597>, pp. 1-3, SYS-CON Media, Inc.

"AmberPoint Express", [online] [retrieved on Dec. 23, 2004], Retrieved from the internet <URL:http://www.amberpoint.com/solutions/express_print.html>, pp. 1-2, AmberPoint Solutions.

Schaffner, Brian, "Debug SOAP apps with Apache TCP Tunnel/Monitor", Jan. 30, 2003, [online] [retrieved on Dec. 23, 2004], Retrieved from the Internet <URL:http://www.builder.com.com/5102-6389-1049605.html>, pp. 1-2, CNET Networks, Inc.

Martin, Bruce, "Build distributed applications with Java and XML", Feb. 2000, [online] [retrieved on Jun. 10, 2005], Retrieved from the Internet <URL:http://www.javaworld.com/javaworld/jw-02-2000/jw-02-ssj-xml_p.html>, pp. 1-3, Java World.

"A powerful new tool to help validate error-handling code", Nov. 2004, pp. 1-4, Compuware Corporation.

"Agitator", [online] [retrieved on Feb. 15, 2005] Retrieved from the internet <URL:http://www.agitar.com/products/000024.html>, pp. 1-5, Agitar Software, Inc.

Related products including SOAPScope 1.0, SOAPScope 2.0, SOAPScope 3.0 may have been offered for sale more than one year before the effective file date of this application.

Some claimed embodiments of the present invention may have been offered for sale, but not more than one year before the filing date of Provisional U.S. Appl. No. 60/700,172, to which priority is claimed.

"Interoperability: The Key to Quality Web Services," Mar. 2004, [online] [retrieved on Nov. 17, 2004', Retrieved from the internet <URL:http:://www.mindreef.com/products/whitepapers/whitepaper-2.html>, pp. 1-9, Mindreef, Inc. [[note: no longer available via the internet.]]

"A powerful new tool to help validated error-handling code," Nov. 2004, pp. 1-4, Compuware Corporation.

"Agitator," online retrieved on Feb. 15, 2005) Retrieved from the internet ,URL:http://www.agitar.com/products/000024.html., pp. 1-5, Agitar Software, Inc.

"AmberPoint Express", (online, retrieved on Dec. 23, 2004), Retrieved from the internet ,URL:http://www.amberpoint.com/solutions/express_print.html., pp. 1-2, AmberPoint Solutions.

"Extensible Markup Language (XML) 1.0 (Second Edition)", Oct. 6, 2000 (online, retrieved on Aug. 3, 2006), Retrieved from the internet <URL:htt;://www.w3.org/TR/2000/REC-xml-20001006>, pp. 1-59, W3C.

"Interoperability: The Key to Quality Web Services," Mar. 2004 (online) retrieved on Nov. 17, 2004; Retrived from the internet: <URL:http://www.mindreef.com/products.whitepapers/whitepaper-2html>, pp. 1-9, Mindreef, Inc., (no longer available on the internet).

"ProactiveNet 6.0 Optimize Application Performance to Meet Business Objectives" 2004, pp. 1-4, ProactiveNet, Inc., CA.

Abbreviated Examination Report, GB0517847.0, Dec. 1, 2005 (1 page).

Barton, J.J. et al., "SOAP Messages with Attachments," World Wide Web Consortium, W3C Note, Dec. 11, 2000, retrieved online on Jul. 24, 2003, from <URL:http://www.w3.org/TR/SOAP-attachments> (8 pages).

Bilorusets et al.; Web Services Reliable Messaging Protocol (WS-ReliableMessaging); Feb. 2005; http://msdn.microsoft.com/library/en-us/dnglobspec/html/WS-ReliableMessaging.pdf (40 pages).

Biron P.V. et al., "XML Schema Part 2: Datatypes," World Wide Web Consortium, W3C Recommendation, May 2, 2001, retrieved online Jul. 11, 2003, retrieved from <URL:http://www.w3.org/TR/xmischema-2> (116 pages).

Box, D. et al., "Simple Object Access Protocol (SOAP) 1. 1," World Wide Web Consortium, W3C Note, May 8, 2000, retrieved online on Jul. 23, 2003, retrieved from <URL:http://www.w3.org.TR/2000/NOTE-SOAP-20000508/> (28 pages).

Bray, T. et al., Extensible Markup Language (XML) 1.0 (Second Edition), World Wide Web Consortium, W3c Recommendation, Oct. 6, 2001, retrieved online on Jul. 11, 2003, retrieved from RL:http://www.w3.org/TR/REC-xml> (44 pages).

Christensen, E. et al., "Web Services Description Language (WSDL) 1.1," World Wide Web Consortium, W3C Note, Mar. 15, 2001, retrieved online on Jul. 11, 2003, retrieved from <URL:http://www.w3.org.TR/wsdl> (40 pages).

Clark, J. et al., "XML Path Language (Xpath)," World Wide Web Consortium, W3C Recommendation, Nov. 16, 1999, retrieved online on Jul. 11, 2003, retrieved from <URL:http://www.w3.org/TR/xpath> (119 pages).

Clark, J., "XSL Transformations (XSLT) Version 1.0," World Wide Consortium W3C Recommendation, Nov. 16, 1999, retrieved online on Jul. 11, 2003, retrieved from <URL:http://www.w3.org/TRxsit> (28 pages).

Copyright © OASIS, 2001, "Oasis/ebXML Registry Information Model v1.0 DRAFT, OASIS/ebXML Registry Technical Committee," retrieved online on Jun. 27, 2001, retrieved from <URL:http://www.oasis-open.org/committees/regrap/documents/rimv1.0.doc> (43 pages).

Copyright © UN/CEFACT and OASIS, 2001, "Message Service Specification, ebXML Transport, Routing & Packaging, Version 1.0," retrieved online on May 11, 2001, retrieved from <URL:http://www.ebxml.org/specs/ebMS.pdf> (75 pages).

Corba Messaging 22: Common Object Request Broker Architecture (CORBA), v3.0.3; Mar. 2004; http://www.omg.org/docs/formal/04-03-12.pdf (p. 85, total: 100 pages).

Fallside, D.C., "XML Schema Part 0: Primer," World Wide Web Consortium, W3C Recommendation, May 2, 2001, retrieved on Jul. 11, 2003, retrieved from <URL:http://www.w3.org/TR/xmischema-0> (57 pages).

Final Office Action dated Oct. 18, 2005 from U.S. Appl. No. 10/015,502 (29 pages).

Martin, B. "Build distributed applications with Java and XML," Feb. 2000, (online, retrieved on Jun. 10, 2005), Retrieved from the internet ,URL: http://www.javaworld.com/javaworld/jw-02-2000/JW-02-ssj-xml_phtml>, pp. 1-3 Java World.

Merrick, P. et al., "Web Interface Definition Language (WIDL)," World Wide Web Consortium, Submitted to W3C Sep. 22, 1997, © 1997, webMethods, Inc., retrieved online on Aug. 11, 2003, retrieved from <URL:http://www.w3.org/TR/NOTE-widl> (16 pages).

Mitchko, J. "Mindreef SOAPscope 1.0", (online, retrieved on Sep. 27, 2004), retrieved from the internet <URL:http://www.sys-con.com/webservices/articleprint.cfm?id+597., pp. 1-3, SYS-CON Media, Inc.

Notification Service Specification; Object Management Group; Version 1.1 formal/Oct. 13, 2004; Oct. 2004; http://www.omg.org/docs/formal/04-10-13.pdf (118 pages).

Office Action dated Aug. 5, 2005 from U.S. Appl. No. 10/015,501 (8 pages).

Office Action dated Mar. 28, 2005, issued in U.S. Appl. No. 10/015,502 (26 pages).

Schaffner, Brian, "Debug SOAP apps with Apache TCP Tunnel/Monitor", Jan. 30, 2003 (online, retrieved on Dec. 23, 2004), Retrieved from the internet ,URL:hhtp://www.builder.com.com/5102-6389-1049605.html., pp. 1-2, CNET Networks, Inc.

Thompson, H.S. et al., "XML Schema Part 1: Structures," World Wide Web Consortium, W3C Recommendation, May 2, 2001, retrieved on Jul. 11, 2003, retrieved from <URL:http://www.w3.org/TR/xmischema-1> (151 pages).

Transmission Control Protocol; Darpa Internet Program Protocol Specification; Sep. 1981; http://www.ietf.org/rfc/rfc0793.txt?number=793 (84 pages).

Web Services Reliable Messaging TC WS-Reliability 1.1; OASIS Open 2003-2004; Oasis Standard , Nov. 15, 2004; http://docs.oasis-open.org/wsrm/ws-reliability/v1.1/wsrm-ws_reliability-1.1-spec-os.pdf (74 pages).

* cited by examiner

METHOD AND SYSTEM TO COLLECT AND COMMUNICATE PROBLEM CONTEXT IN XML-BASED DISTRIBUTED APPLICATIONS

RELATED APPLICATIONS

This application claims the benefit of U.S. Provisional Application No. 60/700,173 filed Jul. 18, 2005 which is herein incorporated in its entirety by reference. A related application concurrently filed entitled "Compliance Method and System For XML-Based Applications" is also incorporated by reference herein.

FIELD OF THE INVENTION

The invention relates to web services, and more particularly, to diagnostic and optimization methodologies and systems for web services.

BACKGROUND OF THE INVENTION

Although the Internet was originally conceived as a communications mechanism, billions of commercial transactions are conducted daily and an entire field has spawned to facilitate and manage the networked communications and transactions.

The client/server model is one form of infrastructure for network computing, and is widely used by many business applications. For a typical client/server architecture each computer or process on the network is either a client or a server. The servers are generally defined as computers, similar devices, processes or computing resources on a network that manage network resources. The servers come in varied forms such as those computing devices dedicated to managing storage devices (file servers), printers (print servers), network traffic (network servers), and databases (database servers). A file server performs as a storage mechanism, dedicated to storing and allocating files accessible to certain users. A print server manages one or more printer or printer-type devices. A network server manages network traffic. A database server processes database queries and related aspects. The servers may be dedicated and perform no other tasks besides their server functions. Alternatively, multi-processing systems can employ a single computer that executes multiple programs simultaneously.

Clients can be personal computers (PC's), workstations, servers or similar computing devices that run one or more applications. The client/server relationship describes the interaction between computer programs, wherein one program, the client, makes a service request from another program, the server, which fulfills the request. Although the client/server concept may be used by programs within a single server, it is more relevant in a network environment. On a network, the client/server model provides a convenient way to interconnect programs that are distributed across disparate locations allowing seamless transactions. For example, a user can easily check the user's bank account balance using the user's home computer. A client program in the home computer forwards a request to a server program at the bank computer. The server program may in turn forward the request to various bank client programs that eventually sends a request to a database server at a bank computer to retrieve the user's account balance. The balance information is returned back to the bank data client and forwards the information to the client in the user's computer which is displayed to the user. There are numerous applications and functions performed by servers and the list continues to grow and expand.

From a processing perspective of a typical client/server model, one server has an active process, sometimes called a daemon that awaits a client request. Once a client request is recognized by the daemon, the server takes some action based upon the client request and invokes one or more programs. This is typically a tightly coupled proprietary binary protocol. In reality, multiple client programs may share the services of a common server program, wherein both client programs and server programs are often part of a larger program or application. By way of illustration, an Internet Web browser is a client program that requests services, such as sending of Web pages or files from a Web server or Hypertext Transport Protocol (HTTP) server in another computer/server on the Internet. The traditional client/server model of a Web server/Web page system provides the user with a graphical user interface (GUI) display on the Web browser. Likewise, the client computer allows client requests for files from File Transfer Protocol (FTP) servers on other computers on the Internet. Another form of network architecture is known as a peer-to-peer architecture because each node has equivalent responsibilities.

Another network infrastructure is called Web services. Web services, sometimes called application services, or Service-Oriented Architecture (SOA), provide a means for businesses to communicate with each other and with clients, wherein the Web services allow organizations to communicate data without intimate knowledge of the various IT systems. Service oriented architecture (SOA) includes services that form part of the infrastructure of a business enterprise, wherein services can become building blocks for application development and deployment, allowing rapid application development and avoiding redundant code. Each service may embody a set of business logic or business rules that can be bound to the surrounding environment, such as the source of the data inputs for the service or the targets for the data outputs of the service. A service is essentially a function that is well-defined, self-contained, and does not depend on the context or state of other services. Web services in one embodiment represent a schema of decentralized systems that are open and loosely coupled with disparate applications woven together by the exchange of extensible mark-up language (XML) messages.

Web services typically use the XML language to create a robust connection, wherein the service-oriented architectures are essentially a collection of services that communicate with each other via a connecting mechanism. The communication may simply pass data or could involve two or more services coordinating some activity.

Unlike the general client/server models, Web services do not provide the user with a GUI, but instead share information, data and processes through an interface across a network. The applications provide the interface and not the users, (e.g., browsers or HTML) thus developers can add the Web service to a GUI (such as a Web page or an executable program) to offer specific functionality to the users. In practice, Web services allow different applications from different sources to communicate with each other without time-consuming custom coding, and the Web services are not tied to any one operating system (OS) or programming language. By way of example, service-oriented architectures has been successfully implemented using DCOM or Object Request Brokers (ORBs) based on the CORBA specification.

Web services provide the ability to decouple the application into functional parts, develop those parts independently using any platform and any language, and have it all work together seamlessly. Web services technology makes Service Oriented Architecture a viable option provided that there is sufficient interoperability of the components. In one implementation, Web services is used to describe a standardized way of integrating applications using the extensible mark-up language (XML), Simple Object Access Protocol (SOAP), Web Service Description Language (WSDL), and Universal Description, Discovery and Integration (UDDI) open standards over an Internet protocol backbone. In this particular embodiment, XML is used to tag the data, SOAP is used to transfer the data, WSDL is used for describing the services available and UDDI is used for listing what services are available.

The Web Services Description Language (WSDL) uses a format, such as XML format, for describing network services (often web services) as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

The interoperability for the Web services is achieved via open specification and through the technology being used (i.e. XML and SOAP) and through the careful designing of the developers creating a Web service. The interoperability is an important aspect of the Web services, and to address the problems of interoperability, the World Wide Web Consortium (W3C) created the Web Service Description Language (WSDL) to bring together the different styles of sending SOAP messages and to reconcile them with a common interface. In simple terms, WSDL allows a service to describe what it expects a SOAP message to look like. The WSDL 1.1 specification allows a service to be implemented using a mix of the different styles and encodings. Although the goal of the W3C was to standardize the different messaging styles under the umbrella of WSDL 1.1, the specification suffered from ambiguity and independent toolkit providers interpreted the specification loosely thereby implementing language-specific idiosyncrasies between various toolkits.

Web Services using SOAP provide a means by which computer software applications can interact across a network. A client application running on one machine on the network sends a XML SOAP Request message, usually but not necessarily using HTTP, Java Message Service (JMS), or Message Queuing, to the Web Service hosted on some other machine on the network; that Service processes the SOAP Request and then sends back a XML SOAP Response message.

The processing involves certain defined Message Exchanges. The pair of messages, the Request and Response, constitutes a Message Exchange. This is the most common type of message exchange—request/response—currently found in Web Service communication. There are other possible forms, e.g. One Way, in which the messages sent by the client have no corresponding response from the service, or Notification, in which the service itself sends notification messages of its own accord, having received no Request message from the client to initiate the action.

A particular session of communication between the client and service can include any number of SOAP Messages that go back and forth between the client and the service. Further, more complex systems can include not just two computers, the client and service, but rather several computers, each of which may be running software applications that can themselves include multiple clients and services within them.

The Service Description is another component of these communications and is typically represented in the form of one or more WSDL (Web Service Description Language) document(s) and possibly several associated XML Schema Document(s). These documents are often generated dynamically by the Web Server on which the Service application is running. They can, however, also be provided as separate, standalone documents, independent of any specific machine or application. The WSDL and XML Schema Documents that form the service description express the 'contract' between the service and the client applications. In particular, the document includes formal, machine consumable descriptions of the valid Request Messages that are understood by the service application and the corresponding Response Messages that will be produced by it. It also includes human readable documentation and explanations of these Message Exchanges, so that the creators of client applications to the service can understand the intended use and expected behavior.

In order to promote more consistent interpretation of the Web service specifications, the Web Services Interoperability Organization (WS-I) was formed to promulgate specific guidelines and recommended practices for using and developing Web services. The WS-I provided the Basic Profile (BP) to address known interoperability issues and is predominantly a restriction of the original WSDL 1.1 specification to the most interoperable practices. However, even within the WS-I, at present there has been no absolute consensus of interoperability and the formulation to ensure the Web services were indeed interoperable.

While there are many toolkits to help automate the design process of Web services, not all the toolkits behave in the same way, and this leads to a wide range of interoperability problems. In current practice, the entire development team must be integrally involved to ensure that the service is compatible with other interoperable toolkits. The Developer needs to have interoperability concerns in mind from the beginning of the development cycle throughout the entire design and implementation. The Project Manager needs to make it a policy to test for interoperability as part of the quality of their service. The Tester has to continually check the quality of the service once in operation. Interoperability has become such a major component to the quality of a Web service, it is absolutely necessary to have tools to help detect and solve interoperability problems when they arise.

In theory, interoperability requires an infinite amount of testing under all possible circumstances. However, in practice, the service is continually monitored and any breakage is repaired and the fix becomes part of the regression tests thereby improving the testing process. The WS-I established a suite of test tools that check a Web service's message exchanges and WSDL against the assertions in the BP. The test tools are essentially passive and require the tester to invoke the service manually, capture the SOAP messages off the wire, and log them in the WS-I's log format. Using the tools effectively is not an easy task and the output of their analysis is a large, flat report. The report serves as an indicator of a service that has failed, but using the report to determine exactly what went wrong and how to begin fixing the problem is difficult and tedious.

In traditional environments, Support teams work with stand-alone or "silo" applications that perform all functions within a closed system. Diagnosing and successfully addressing problems within these environments, though not always easy, offers a fairly predictable support path. But Web services present a significant change to this model. Unlike closed systems, Web services are designed to be highly distributed and flexible in order to interoperate with other services in service-oriented architectures (SOAs), within a single organization or among worldwide networks. So when a problem occurs with a particular supported service, finding its root cause is significantly more complex in that the problem may not have originated within that service, but rather with any one of a large number of other services with which that service interoperates.

Web services present a number of additional challenges for support teams. First, they must recognize the need to support a more technically sophisticated customer base that includes architects, developers, testers, and operations staff, either within their organization or with outside partners and customers. They must also recognize that, unlike application or Web sites, Web services are built upon application programming interfaces (APIs) that do not contain a user interface, raising the complexity of the support equation.

Successfully incorporating Web services support into the support environment requires a transition to a new and forward-looking set of tools and best practices.

Organizations face a number of new challenges as they begin supporting Web services. Chief among these is that they will find themselves supporting a very different set of clients. Traditionally, support teams work with end-users of specific applications. With Web services, however, the client base consists largely of developers, testers, operations, and support staff. Supporting these more technically sophisticated groups requires a very different set of skills and tools.

Another issue facing teams supporting Web services is the lack of a graphical user interface. In traditional application support environments, support teams and customers resolve problems by viewing an application together to assess at what point a problem arises. Having a common user interface provides a common frame of reference that allows for more efficient collaboration. Web services problems, however, are not as visual or apparent as are problems related to a Web application or site since they are built using APIs, which do not contain a user interface. This leaves no visual point of reference for a client and a support team member to discuss a Web services problem in its full context.

In the current Web services support methods, diagnosing and acting upon problems related to a Web service requires a good deal of collaboration between customers and support teams. But this process is made difficult by a number of technical barriers, including those mentioned previous. This has led to a system of less formalized, inefficient support methods. The most common method consists of an exchange of e-mail containing snippets of complex XML data related to a particular problem. The lack of a formal process and context inherent in this method make it vulnerable to spinning out of control, leading to a poor customer support experience.

By way of example, a typical scenario begins with a customer contacting a support team member to discuss a problem encountered with a Web service. The team member asks the customer to submit a code sample related to the problem via e-mail for analysis. However, when the team member receives the e-mail, the team member typically does not have sufficient information to diagnose the problem because the customer submitted code that lacked critical information such as the time at which a problem occurred, the particular server or servers that were accessed, the data sent to and/or received from the service, and a number of other vital details.

At this point the support representative typically contacts the customer to request that customer submit a further test case or complete code in order to provide a clearer picture of the problem. However, once received, other issues become evident. Since the code was sent via e-mail, the team member is not able to perform any debugging and must take the step of writing a client application in order to emulate the problem. But, in this example, the client's code was written using Microsoft's .NET platform while the team member works strictly within a Java environment, making it impossible to debug the code and to create a reproducible case in its native format.

The result is that the customer does not receive a satisfactory support experience while the support rep spends a larger amount of time than is usually spent on a particular case, but is not able to provide effective help for the customer. This level of inefficiency can have significant economic and relationship consequences for any organization supporting Web services.

Given the potential for a poor customer support experience and limited success within the support team, a set of requirements need to be in place to ensure that support teams have the tools and processes they need to optimize their environment for Web services support and instill greater confidence from customers.

One of the requirements for proper web services support is adequate training. Web services require a very different set of support skills. It is essential that support teams receive an adequate amount of training to better understand the unique character of Web services and the specific needs of their new client base. Given the rapid rate of Web services adoption, additional headcount may be necessary to bring these new skills and experience more quickly into the support team Another web services requirement is the appropriate tools and processes. Supporting Web services successfully requires tools and processes that can address a new set of support challenges. To be successful, tools should include the ability to capture problem data in its entirety to provide a complete view of a problem, and the ability to capture, view, analyze, and perform tests on data, regardless of the platform in which it was created.

Diagnosing and resolving Web services issues is a highly collaborative process. As such, customers and support teams must have tools at their disposal that allow them to view problem data together in order to talk through a problem. Without this visibility, both sides are forced into the laborious task of attempting to describe in detail a highly technical problem or trading e-mail containing incomplete data. In order to fully understand the path leading to a Web service failure, support representatives should be able to reproduce and analyze the problem. Doing this requires a tool that allows for complete problem capture and storage such that it eliminates the need to create ad-hoc clients from customer-supplied code snippets.

Web services have gained credibility as a reliable and effective means of fulfilling the goal of integrating data and applications worldwide. But with this promise comes a level of complexity and interdependence that can lead to serious problems for organizations not prepared to handle their unique support requirements. Organizations that are supporting Web services must be able to support their clients in a way that provides full context and insight into a problem while not relying on a particular platform.

What is needed is a way for support teams and customers to diagnose and resolve Web services problems intuitively within a highly visual environment. The Support Solution should also includes a suite of best practices that help organizations provide a high-quality support experience for customers while driving down costs by creating a more efficient and responsive support environment. What is needed are techniques for collecting and managing artifacts that comprise the problem context related to a distributed XML-based application problem, and packaging the context in a way that facilitates testing, supporting, maintaining, troubleshooting, debugging and communicating a reproducible problem. What is needed is a Web service tool that can analyze, detect, and resolve the interoperability issues.

SUMMARY OF THE INVENTION

One embodiment of the present invention is a reproducible package of a web service scenario, having at least one web service client coupled to a network, at least one web service coupled to the network, and a collector, wherein the collector extracts a set of message exchanges between the web service client and the web service. A closure builder captures a service description at a specified time and a workspace repository is coupled to the collector, wherein the workspace repository stores at least one of the set of message exchanges and the service description to create the reproducible package of the web service scenario.

The reproducible package according to one embodiment is created from at least one of the group consisting of: the set of message exchanges, the service description and a combination of the set of message exchanges and the service description.

Another feature is a web service invocation component coupled to the network and the workspace repository, wherein the invocation component provides at least one invoked message exchange.

The collector according to one embodiment is selected from at least one of the following consisting of: network collector, web service client collector, and web service collector.

In a further embodiment, the service description includes at least one of the group consisting of: WSDL documents, schema documents, and meta-information.

The reproducible package according to one embodiment includes at least one of the group consisting of: WSDL closures, SOAP message exchanges, notes, simulation scripts and playback scripts. In addition, the reproducible package can be in a portable data format.

According to one embodiment, the specified time is about approximately a timeframe that the collector extracts the set of message exchanges.

Another embodiment is a method for capturing message-based scenarios for distributed applications, comprising establishing communications between at least one web service client and at least one web service, collecting message exchanges between the web service client and the web service, and reproducing a web service scenario from the service description and the messages exchanges.

A further feature includes capturing a service description of the distributed applications at a specific time and reproducing the web service scenario from the service description and the messages exchanges.

An additional embodiment includes storing at least one of the collected message exchanges, the service description and the web service scenario in a workspace repository.

Another feature includes invoking a user-initiated message exchange and reproducing the web service scenario from the user-initiated message exchange. An additional feature includes manipulating the message exchanges and/or the services description and reproducing a manipulated web service scenario.

The method may also include producing a logically equivalent service description for some portion of the service description.

An additional embodiment is a process for collecting and communicating reproducible web service artifacts, comprising capturing a set of service description artifacts, creating a workspace from at least a portion of the set of service description artifacts, wherein the workspace is a reproducible representation of a web service scenario, and sharing the workspace.

Another feature includes collecting a set of messages exchange artifacts between a web service client and a web service, wherein the workspace includes the set of message exchange artifacts.

The sharing can include exporting the workspace as a portable data file. The process may also include storing service description artifacts and/or the message exchange artifacts in a relational database. In addition, another feature includes manipulating the workspace.

One embodiment of the present invention provides Reproducible Packages (RPs) that captures, shares, and replays XML message-based scenarios for distributed applications.

A further embodiment relates to a combination of comprehensive tools and best practices designed to provide a high-quality customer experience while driving greater efficiency and cost reduction into the Web services support environment. An aspect of the present invention includes a Web services diagnostics and collaboration tool that contains a feature set that eliminates the most difficult problems blocking the path to more effective Web services support. Customers using the tool can often reduce or eliminate the need for support. Organizations that proactively provide customers with the present invention can greatly reduce overall support costs in this manner.

The present invention captures problem data in its entirety, providing a complete view of the problem. This allows customers and support teams to work collaboratively to discover exactly when, where, and how problems occur and take corrective action.

The present invention is completely platform independent ensuring that clients and support teams can collaborate fully on a given problem, regardless of what platform was used to build the code.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention encompasses a number of embodiments and features for diagnosing and troubleshooting Web service problems. It should be readily apparent that the various implementations provided herein fully illustrate embodiments of the invention, and are not intended to limit the scope of the invention. The various processes can be performed by using software executed by one or more general-purpose computers or be integrated partially or wholly within hardware without altering the present invention. Thus, as used herein, the various components may be any combination of software, firmware, or hardware used to perform the specified function or functions. Furthermore, the described components may reside at different locations connected through a wired or wireless network, or the Internet. While described in terms of certain current languages, protocols and nomenclature, the present invention is not limited to any such platforms as the functionality detailed herein represents the inventive elements.

Figure 1A:
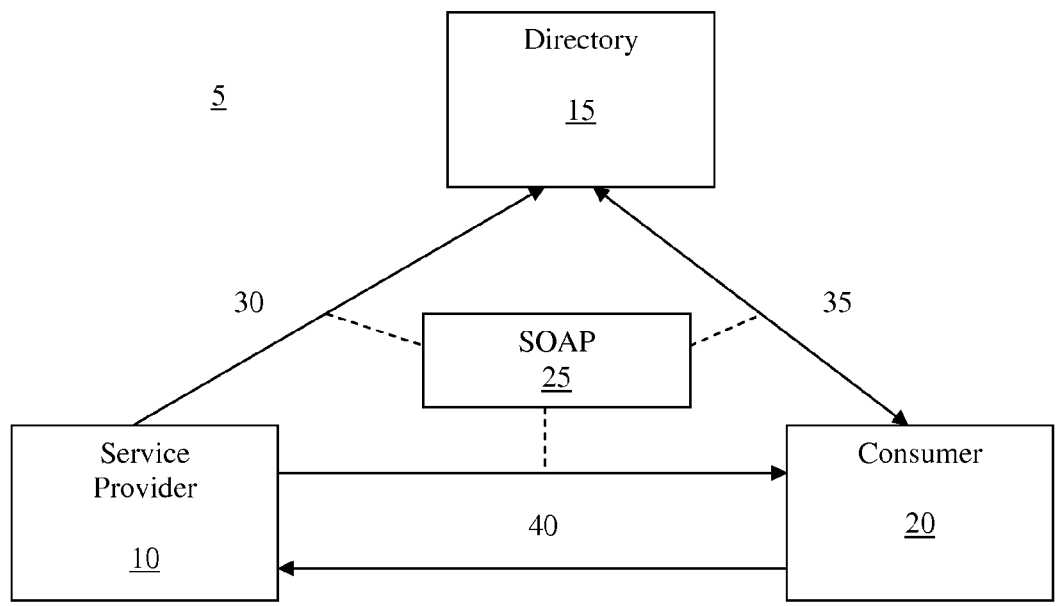
FIG. 1*a* is a prior art top level perspective illustrating the Web services elements and more specifically the interactions between service providers and consumers using Web Services Description Language (WSDL).

An illustrative example of a service-oriented architecture is shown in prior art FIG. 1a depicting the Web Services Description Language (WSDL) that forms the basis for Web Services. The service provider 10 sends a description of the services descriptions 30 using a standard XML language with specifications such as WSDL and may communicate these services to the directory 15. The definitions for those services are published in a directory 15 such as the UDDI or ebXML, although other forms of directories can be used. In other embodiments, the directory 15 is not included and the interaction is simply between a provider 10 and consumer 20. The directory 15 has a number of searching mechanisms and holds details about the service provider 10. The consumer 20 sends one or more service request queries or directory queries 35 to the directory 15 in order to locate a service and determine the proper communication protocol for that service. In response to the directory request, certain information about the service provider is sent back 35 to the consumer 20. Such information may include the format for the requests and responses applicable to the service provider and communicated via XML language with specification such as WSDL. The consumer 20 then communicates with the service provider 10 in the appropriate format by sending the service request 40. The service provider 10 fulfills the request and sends back a response 40. The request and the response are both pre-established and defined according to some protocol or standard such as XML and communicated based on WSDL, wherein WSDL uses XML to define the messages using XML's tagged message format. SOAP 25 provides the mechanism for communications and generally uses HTTP as the connection.

Figure 1B:
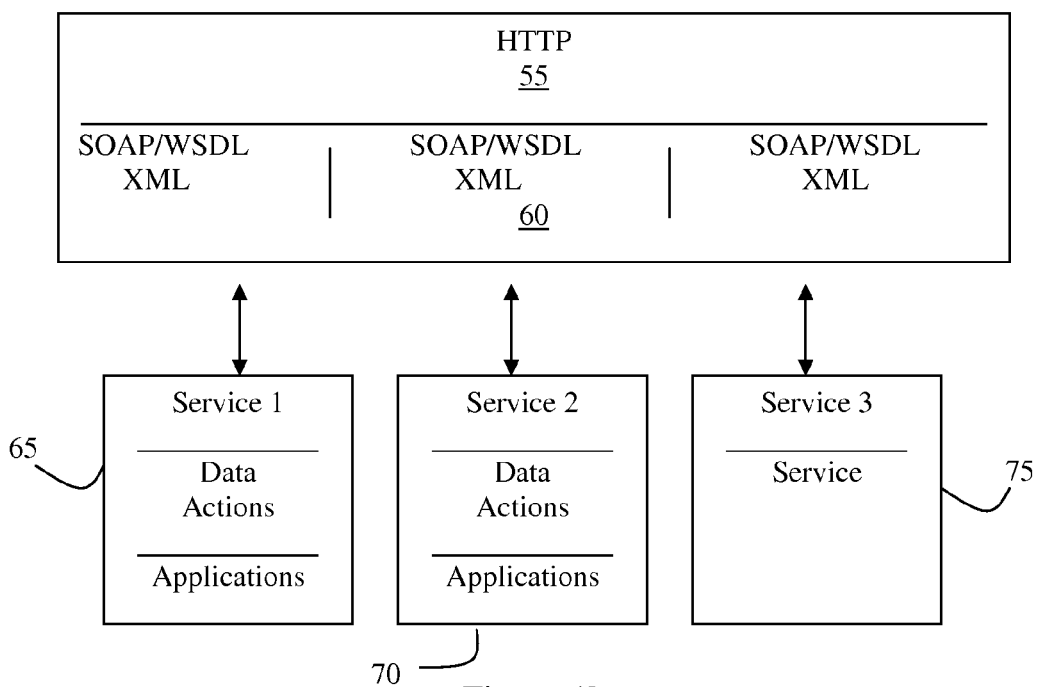
FIG. 1*b* is a prior art simplified block diagram showing a Web services topology and the elements involved in the Web Services.

A simplified illustration of prior Web services is shown in FIG. 1b. The Web services 50 integrate the directory and SOAP communications mechanism and can be analogized to the bus in a computer that communicates among various circuit boards. The service requestor can be a service provider or a service consumer depending upon the application. The HTTP 55 provides the connectivity between the service blocks 65, 70, 75. The service communications block comprising XML and SOAP/WSDL 60 establish communications. XML allows the disparate systems to communicate with each other via the HTTP connection path. SOAP/WSDL provides the communications mechanism by establishing the interoperable standards to couple the service blocks, wherein Service 1 65 can be a COBOL application, Service 2 70 can be a Java application and Service 3 75 can be a .NET service provider.

Figure 2:
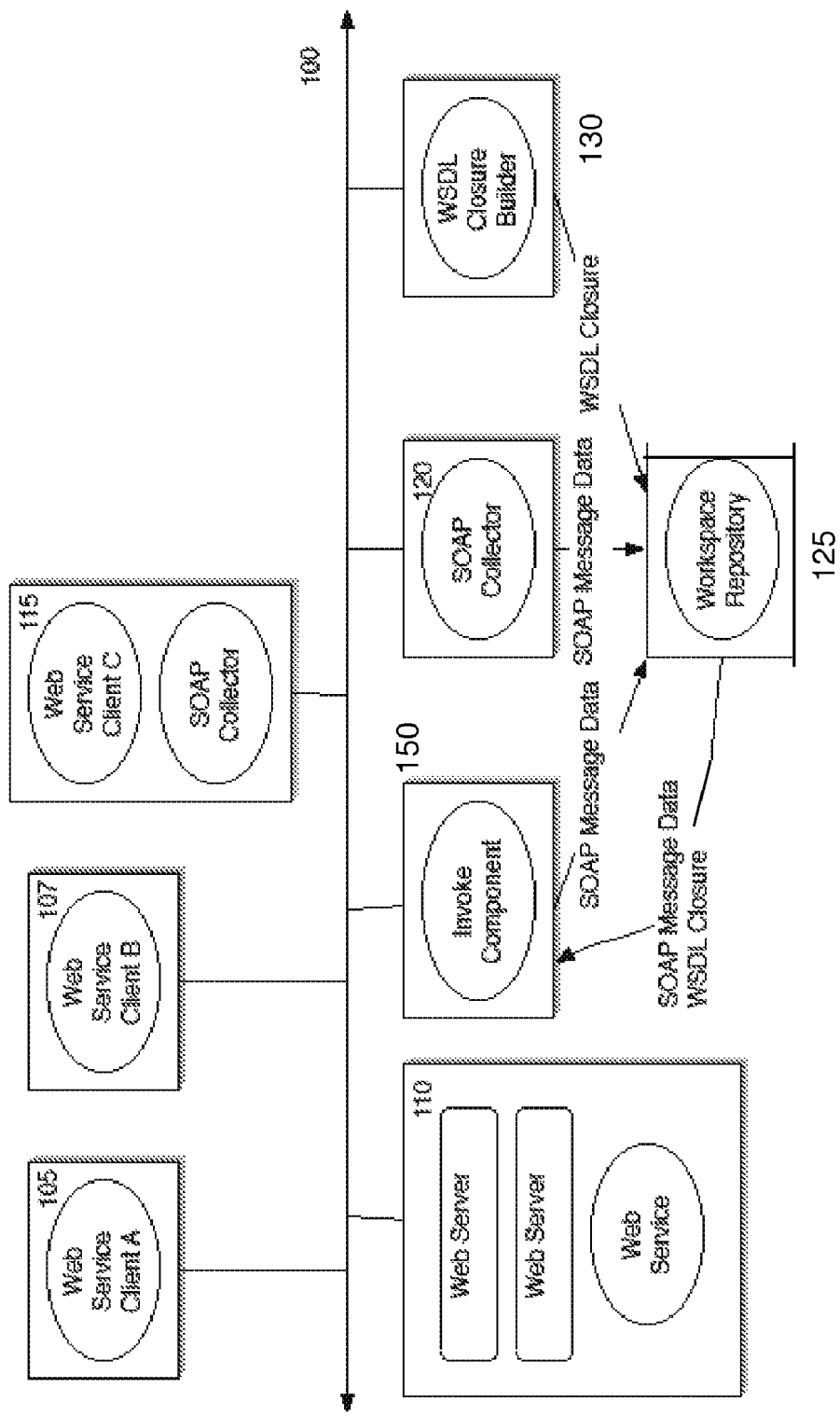
FIG. 2 is a simplified block diagram illustrating the major system blocks for the Reproducible Package System according to one embodiment of the invention.

The Reproducible Package System, according to one embodiment of the invention provides the mechanism and system to capture, share and replay XML message-based scenarios for distributed applications. FIG. 2 shows a block diagram of the major system blocks for the Reproducible Package System according to one embodiment.

Referring to FIG. 2, a simplified illustration shows the manner in which the SOAP collector 115, 120 and the Workspace Repository 125 are coupled to a typical Web Service system. The network 100 provides the communication link among a number of devices and applications coupled to the line 100. The network 100 includes any communications link such as Internet, Intranet, Extranet, and wireless. There are generally multiple clients 105, 107, 115 along with multiple web servers 110. The web server 110 can further encompass multiple web servers and an application server that runs one or more Web Service applications. The clients 105, 107, 115 can be any device that each run one or more web service client applications.

The collector component ("Collector") 120 can be a software process running on a device that is coupled to the line 100 such as a sniffer. The collector 120, typically a SOAP collector, thus obtains, in high fidelity, the XML request and response messages that are sent between the web service clients and servers. Alternatively, the SOAP collector mechanism can be deployed integrally with the Client 115 or web server for obtaining these data directly from those applications. The Collector 115, 120 therefore assembles the required message exchange data in several ways, for example, a transport independent network collector such as any type of sniffer or proxy, a web service client collector, and a web service collector.

A Closure Builder component ("Closure Builder") 130 can be a software process running on a device that is coupled to the line 100. The Closure Builder 130 creates a complete snapshot of a service description. The documents that comprise the service description (such as WSDL and Schema documents) can be obtained, for example, via the network 100 using HTTP from the Web Service application server that is hosted on a server 110 to create a WSDL closure. The Closure Builder 130 can also be deployed integrally on a Server 110, whereby the documents can be obtained directly from a file system residing on the server. As should be readily apparent, there is no requirement that these documents exist on the server where the service is running, and such documents could be in an entirely different location. For example, the documents may be located on an internal corporate website that hosts the current revision of the service descriptions. Alternatively they may be hosted on a file system, or as part of a repository. Further, there is no requirement that the documents that comprise the service description be located at exactly one location, they may be spread out across any number of locations.

Closure Builder 130 can thus compile all these documents, and their interconnections, into a complete Closure, such as a WSDL closure, which is a snapshot in time of the total of all these documents, which are subject to change on the server over time.

In one embodiment, the system combines a set of messages from the Collector 120 into a workspace. In some cases, this may sufficiently represent the problem context in its entirety. For example, if the set of messages contain bad or erroneous data discernable by simple inspection or analysis, or a re-execution of the messages causes a web service 110, or web service client 105, 107, 115 to behave in a non-optimal or fatal manner. In another embodiment, the system combines a set of messages from the Collector 120, and couples them with any number of WSDL Closures produced by the Closure Builder 130. These WSDL Closures may be from service descriptions captured at varying times relative to when the messages were captured. For instance, consider a web service client 105, 107, 115 bound to a service description, and the same service description captured as a WSDL Closure by the Closure Builder 130. One would expect the messages generated by this client to be well formed with respect to the service description. A workspace that contains a set of messages that does not respect the WSDL Closure coupled to them would be very useful in diagnosing interoperability or behavioral problems. If messages, generated by a client bound to an out of date service description, have been added to the workspace, capturing a WSDL Closure of the latest service description would aid in comparing these messages against the newer standard, by which they may fail. There are many variations, including capturing multiple WSDL Closures of the same service description, at various points in time, and associating them to messages in a workspace. For example, a complete problem context might include a WSDL Closure of a service description at a time when a client of interest bound to the same service. The problem context would also include a set of message exchanges generated by said client. Finally, a second WSDL Closure of a newer version of the same service description can be included in the problem context. This would aid in diagnosing the various problems associated with changes in a service description, and the behavior of old clients interacting with newer services. These problems are sometimes referred to as "versioning problems". Finally, there are cases when a client cannot bind to a service description, because the description is of low quality (for example, malformed XML, unlinked QNames, or non-conformance to industry schemas), or fails to pass a certain set of standards or analyses. In these cases, it is useful to capture the service description alone, and contain it in a workspace. Captured in its totality, and perhaps with some user added metadata, the WSDL Closure of the service description is a sufficient problem context. A user could use this workspace to furnish the service description, so as to inspect a client while binding to it, or as to rerun an analysis. These examples illustrate some of the ways in which a workspace captures a problem context, but does limit the invention.

The Workspace Repository component ("Repository") 125 can be a software process running on a device and is typically coupled to one or more Collectors 120 and one or more Closure Builders 130. The Collector 120 and Closure Builder 130 components can be processes running on separate devices, and if the device that runs the Repository is coupled to the network 100, then these components can be connected to the Repository 125 by way of this medium. Alternatively, any of the elements, Collectors 120 or Closure Builders 130, can be independent processes on the same device as the Repository 125, or even components within the same software application as the Repository 125.

Whatever the method of connection, the Collector 120 and Closure Builder 130 provide their product (Message Exchange data and WSDL Closures, respectively) to the Workspace Repository 125. The Workspace Repository 125 can thus unify all of this data into one location, thus representing a complete, reproducible scenario or problem in what is called a Workspace (aka Reproducible Package). As detailed herein, the Workspace combines the artifacts from the Message Exchange with the corresponding artifacts from the WSDL Closure such as the accompanying documents and metadata for a specified time and thereby captures a reproducible web service scenario. The Repository 125 will allow a user to modify this Workspace, by choosing the specific messages and Closures that they wishes to include in the Workspace. According to one embodiment, the workspace storage 125 can be used as a portable workspace storage to allow the user to use the portable workspace as a sandbox to test or otherwise work with a particular workspace. The workspace repository 125 can also have a persistent workspace storage to save legacy or prior workspaces for historical purposes.

In another embodiment it also allows the generation, both automatically and manually, of a Playback script. This Playback script, also known as a test script, defines a number of Web service invocation requests over time, in a significant order. This ensures the Reproducible Package more accurately reflects the situation it has captured.

A Web Service Invocation component ("Invoke") 150 can be a software process running on a device that is coupled to the line 100. This Invoke component 150 is also coupled in some fashion to the Workspace Repository 125. Again, if the Repository 125 is itself on a device that is coupled to the network 100, then the Invoke element 150 can simply be a component within the same software application as the Repository 125.

Originating from the description inherent in a Closure, which is obtained from the Repository 125, an Invoke component 150 allows a user to manually author, for example, Web Service request messages, send them over the network 100 to a running Server 110, receive the server's response message and provide this message exchange data back to the Repository 125 application. Invoke component 150 can also initiate such a request message from messages obtained from the Repository 125 instead of from a Closure 130. In effect, this operation is similar in some respects to that of the Collector 120, wherein, it is another method by which message exchange data can be included in the Workspaces created by the Repository 125. Thus, in one embodiment the invoke component 150 allows a user to intervene between the web service and web service client communications and establish a user message exchange that can be packaged and stored on the workspace repository thereby facilitating a mechanism for diagnostic testing.

Figure 3:
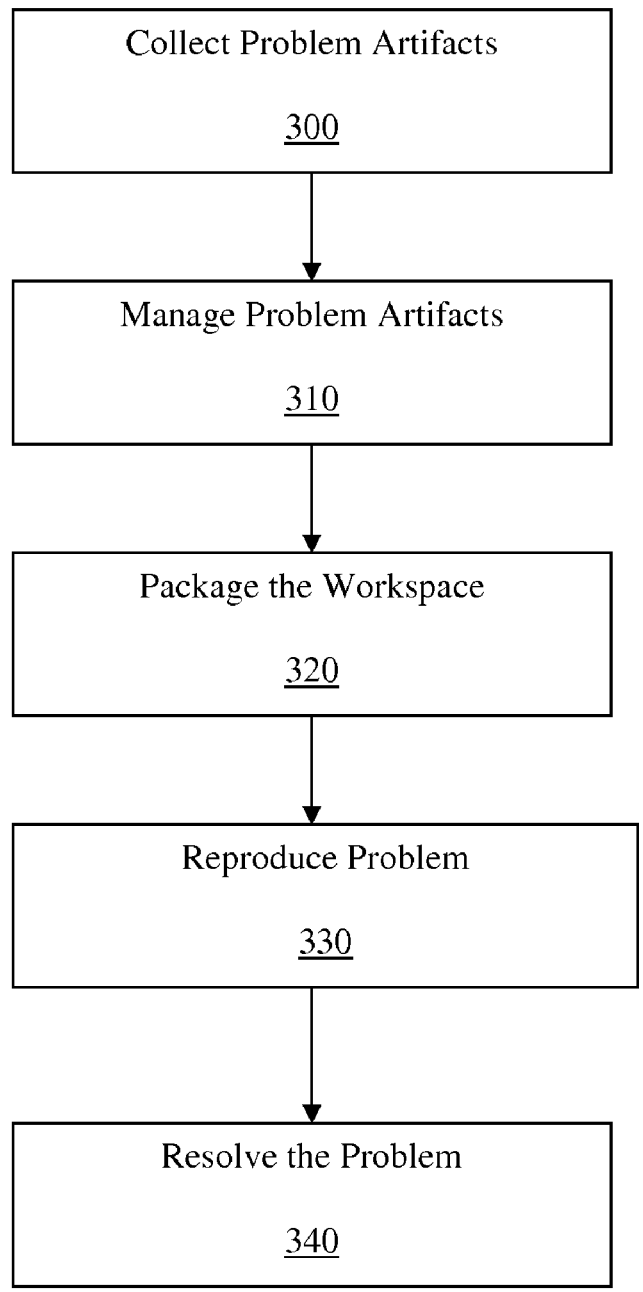
FIG. 3 is a simplified flow chart perspective illustrating the processing of a Reproducible Package in accordance with one embodiment of the present invention.

FIG. 3 illustrates a high level process flow by which the Reproducible Package system can be used to capture relevant data from a web service scenario into a Reproducible Package and then to reproduce that scenario. There are several mechanisms described herein for collecting the artifacts.

Collect Problem Artifacts

The first step in the process is to Collect Problem Artifacts 300. In this step, the Collector and Closure Builder components are used to collect, respectively, SOAP message exchanges and WSDL and XSD service descriptions as they occur in a web service scenario of interest. The Collector and Closure Builder collect these artifacts and forward them to the Workspace Repository.

Within a given scenario, problem or session of activity in a Web Service situation, the WSDL document as well as the actual Message Exchanges being sent to and received from the service application are all 'artifacts' of import and interest and may be subject to collection.

There may be many message exchanges that occur in a scenario. Messages are sent by a client application over the network to one or more web service applications, with the web service possibly sending a response message back to the client. While much of the data from the message are available within these client and service applications, the full message as it appears over the network is often not available. For example, if, as is most often the case, the network protocol used is HTTP, then the client and service applications may not have access to the HTTP headers that were sent with the HTTP Request and Response messages. On the other hand, the "wire" message (e.g. the HTTP message as it appears over the network) may be missing important context such as information about how it was generated or encrypted, for example. These data may only be available from within the client or service application that generated the message, or possibly only from within the application containers that house those applications.

Manage Problem Artifacts

Referring again to FIG. 3, the next step is to Manage Problem Artifacts 310, wherein the Workspace Repository is used to organize the collected artifacts into one or more Workspaces. A Workspace is the complete, reproducible representation of a web service scenario. It may contain any number of WSDL closures, SOAP message exchanges, notes, and "Playback" and "Simulation" scripts. The Workspace Repository allows the end-user to manually select the artifacts relevant to the web service scenario in question into a Workspace, allowing a playback script to identify the error in a reproducible format. Further, the Invoke component allows a user to manually edit and resend an existing message or to manually create and send a new message using the service description's WSDL and XSD documents. These new messages can then be selected for inclusion in a workspace. The Workspace Repository may also be configured to automatically select artifacts for inclusion into a workspace based on either pre-defined or user-supplied rules. Thus, the user can make changes to the various artifacts and run a playback script to confirm whether the change fixes the problem.

In order to allow a workspace to be shared among different users, the system allows the user to Package the Workspace 320. If the Workspace Repository exists on a server common to multiple users, then a workspace may be shared between the different users on the workspace simply by allowing access to the workspace for users other than the user(s) who created it. Additionally, the Workspace Repository can export the Workspace into a portable data format, such as an XML file or a ZIP archive. This file can then easily be stored on disk for later use or transferred to another user. The file, which contains all the data from the exported workspace, can be loaded for use by that same instance of the Workspace Repository that created it, as well as by a separate instance of the Workspace Repository that may be deployed on an entirely different device or network.

Once message exchanges and WSDL closures have been collected and forwarded to the Workspace Repository, the Workspace Repository allows for both the automatic and manual (i.e. end-user) organization of these artifacts into one or more "workspaces". A workspace is a complete, reproducible representation of a web service scenario. It may contain any number of WSDL closures, SOAP message exchanges and notes, but is not limited to only these artifacts and also may include further artifacts from the subsequent actions and reactions.

The Workspace Repository maintains a set of artifacts that have been collected by one or more Collector and WSDL Closure Builder components, so that they can be included in workspaces. In one implementation, the Workspace Repository stores these collected artifacts in a relational database.

Once the artifacts are collected, they are typically stored in a system data store as a package, which may be a relational database which includes references to files that contain message bodies and WSDL closures. Another implementation stores all artifacts in a relational database.

Package the Workspace

Referring again to FIG. 3, the next step is to Package the Workspace 320. A workspace, since it contains the complete and accurate data of a web service scenario, can be used to Reproduce the Problem or scenario 330. This is true whether the workspace in question is used from the instance of the Workspace Repository where it was created or from an instance deployed elsewhere, where it may have been loaded from a file. Firstly, the Workspace Repository can, by way of a graphical user interface, allow a user to browse any or all of the artifacts in the workspace. Thus, the user can view the SOAP message exchanges (including, for example, timing information, HTTP metadata and XML content, among other data); and all of the WSDL and XSD documents comprising the service descriptions just as they appeared when those artifacts were captured. These artifacts are viewed exactly as they occurred in the original scenario, even if the context in which it occurred has changed or the Workspace Repository is in a different location with no network access to the original system in which it occurred.

As is well known, the most difficult problems are those that are not readily reproducible. As such, the present invention allows a user to reproduce problems from an active workspace, run various debugging tools on the active workspace and share the problem with others. Not only can the present system create a reproducible package in an active workspace, it also allows the user to modify that version in the live workspace to test out potential fixes.

According to one embodiment, a package manifest is created that gives and itinerary of the elements of the active workspace and Context information is included. The WSDL closures are included in the package along with XML messages. The user also has the option to include notes and comments about the problems in order to facilitate the debugging process. A test template and test scripts can be integrated with the package.

Figure 5:
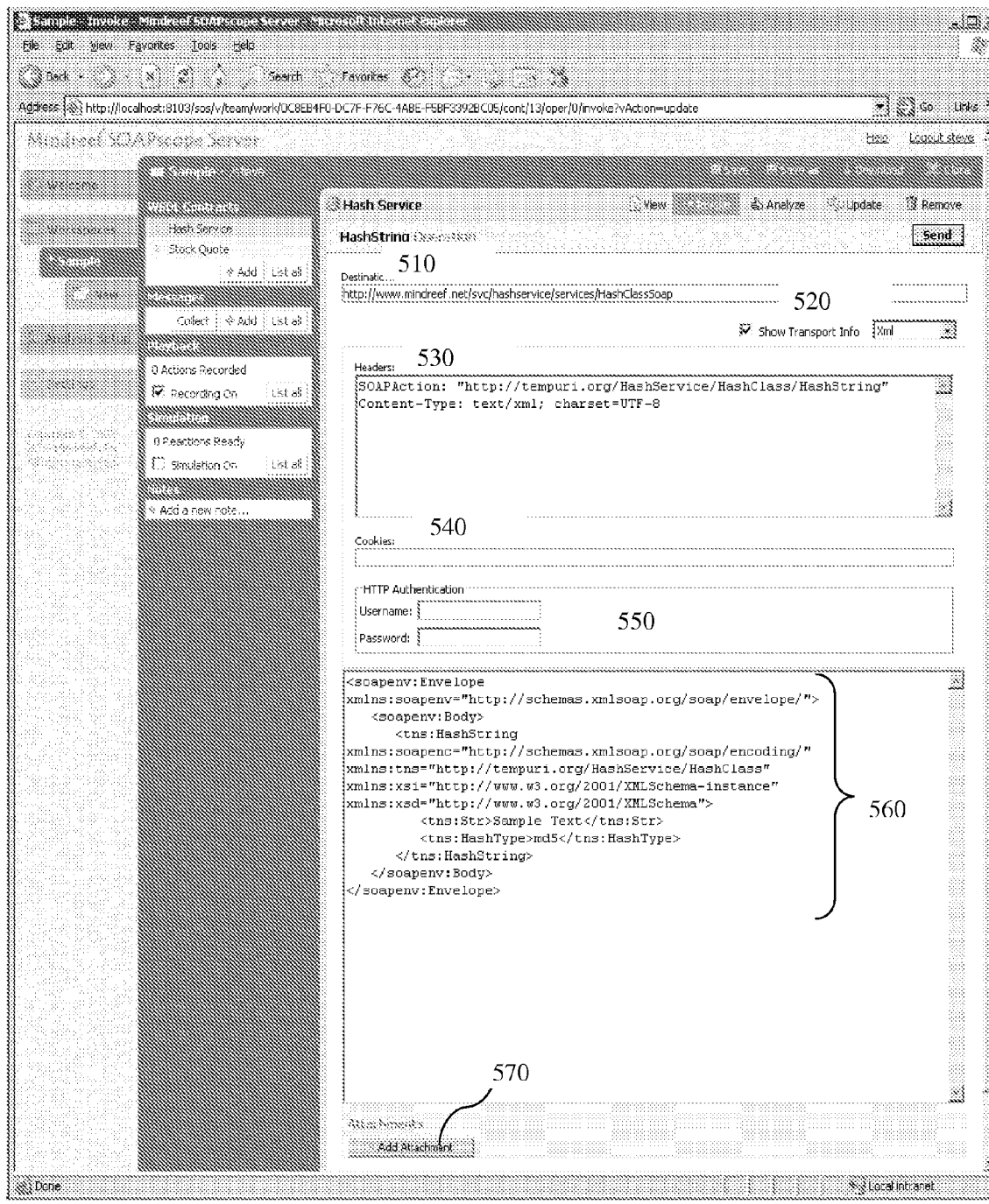
FIG. 5 is a graphical user interface screen display of the Invoke feature of the system.

In addition to being able to browse the contents of a workspace as a historical record of the web service scenario, users may also actively reproduce the scenario. An Invoke component coupled to the Workspace Repository allows users to resend the messages in the workspace. These resends may be edited by the user in a variety of ways to ensure that the relevant parts of the messages are being reproduced. For example, if, when the scenario is being reproduced, the address of one or more of the services has changed, the user may change the original destination of the message to point to the correct one; or, if one or more parts of the XML content, such as authentication or timing information, need to be changed, the user may edit these as well before resending each message, as shown in FIG. 5.

The Workspace Repository may maintain the data in one or more workspaces. These data may be stored in a relational database coupled to the workspace repository application, on the filesystem of the device on which the repository is running or some combination, in memory on that device, or some combination of these.

Additionally, the Repository may provide the ability to "export" a workspace into a portable format. There are many ways in which the data in a workspace may be serialized. In one implementation, the workspace is exported as a "zip" archive file. This file includes a "manifest.xml" entry, which is an XML file describing each of the artifacts in the workspace. The descriptions in this file of each message, WSDL closure, and test script or simulation template include a reference to the location, within the zip archive, of an additional entry that contains the raw binary data for that artifact. In another implementation, the workspace is exported entirely as one XML file. This format is similar to the manifest.xml described above, but includes base-64 encoded data inline instead of referring to external zip entries.

Whatever the format, these exported workspaces may be saved and later loaded into either the same Repository where they were created or another instance of the Repository deployed on a different device, network and/or platform. The exported workspace contains all of the information contained in the workspace in such a fashion that the workspace can be reloaded accurately and in its entirety by any instance of the Workspace Repository. This includes, at least, all of the WSDL closures, all the message exchange data, simulation scripts, playback scripts, and all notes that the workspace contains. Thus an entire web service scenario can be examined and reproduced entirely independently of the time and situation where it occurred.

Reproduce the Problem

Once the package elements have been coherently packaged, it is stored and subject to retrieval to reproduce the problem 330. The system can generate a .mrp file with all the various pieces. A further aspect is to produce a URL that points to the package.

The Package Storage and Retrieval typically store the package as a .mrp file. In one embodiment, the steps include gathering the package elements from the active workspace (Message exchanges, Closures, playback scripts, simulation scripts, and/or Notes); Creating (opening) a new ZIP format file to serve as the .mrp file; Writing the "raw" byte-level data for Messages, Closures, playback scripts, simulation scripts as individual ZIP file entries. For clarification purposes, the Raw data for message represents the bytes of the message, as originally transmitted; the Raw data for closure represents the .mwc format file used to store Closure data; the Raw data for playback and simulation scripts is represented as an xml serialization of the test frame's Value Bindings into SOAP formatted message bytes.

The package storage and retrieval step continues with writing an XML manifest file, also as a ZIP entry, containing an entry with additional information for each package element. For each element's manifest entry, it may includes the name of its raw data entry, if applicable; XML Data for Message; Transport information (e.g., HTTP Headers), duration, timestamp (capture date); XML Data for Closure; root URL; XML Data for Test Frame; header template, xml template, timing information; XML Data for Notes; and a timestamp.

As described, it is possible to store the package on a remote facility. Storing the package on the remote facility is processed by the following steps: Creating a temporary .mrp file; Uploading the file to the remote package server; Loading the package elements into a database on the remote server; and Returning a URL that can be used to retrieve the package on the remote server.

Retrieving a package, for example from a .mrp file, in order to load the package into the active workspace is processed in one embodiment as follows: Creating a local, temporary copy of the .mrp; Parsing the ZIP entries, and locating in particular the manifest. From each entry within the xml manifest, the system uses the xml data therein, and possibly a reference to another ZIP entry containing raw data, to reconstruct the package element. Upon successfully reconstructing all the package elements that were understood from the manifest, the user can create a new active workspace and populate it with the various elements.

Retrieving a package from a URL follows the same process, but the local, temporary copy of the .mrp is retrieved over a network connection. After the package is retrieved on the remote package server, it is presented in the active workspace on the remote server for manual replay and other testing functions. It can be downloaded to a local file system as a .mrp file, which can be loaded into any available active workspace.

Resolve the Problem

Once the reproducible package has been created, it can be reproduced and accessed via an active workspace or package server/test facility to work on the problem 340. According to one embodiment of the invention once the reproducible package is in the active workspace, the reproduced problem can be replayed as a manual replay or a script replay. Either type of replay can originate by resending captured messages or by using the typing information in a WSDL closure to generate a new message.

In the manual replay mode, the user invokes or resends the problem from the Service Definitions of the WSDL closure in order to view the error in several different formats. Manual replay sends a single message under end-user control, with the validation of results performed by visual inspection. The WSDL Invoke feature of the present invention permits the developer to do a quick test. The message data can be entered in a simple form, or the entire SOAP envelope can be edited directly as XML. It allows the user to resend the message and assess whether the correction to the program was successful or not. As the workspace contains all the necessary pieces, it is possible to isolate the problem and do one message per test.

Finally, good engineering practices always recommends performing a validation check that authenticates that the problem has been fixed. Scripted replay can send multiple messages based on a test script without user interaction, and results can be captured and preserved as a labeled result set. Automated data entry, data threading (also referred to as variable threading), assertion validation, and analysis of test results are performed with scripted replay. Scripted replay can be performed via an interactive application or it can be invoked via web service from various clients including automated build scripts and command line tools. In addition to manual and scripted replay, diagnostics tools are used on the package artifacts including visualization, differencing, and static analysis.

Figure 4:
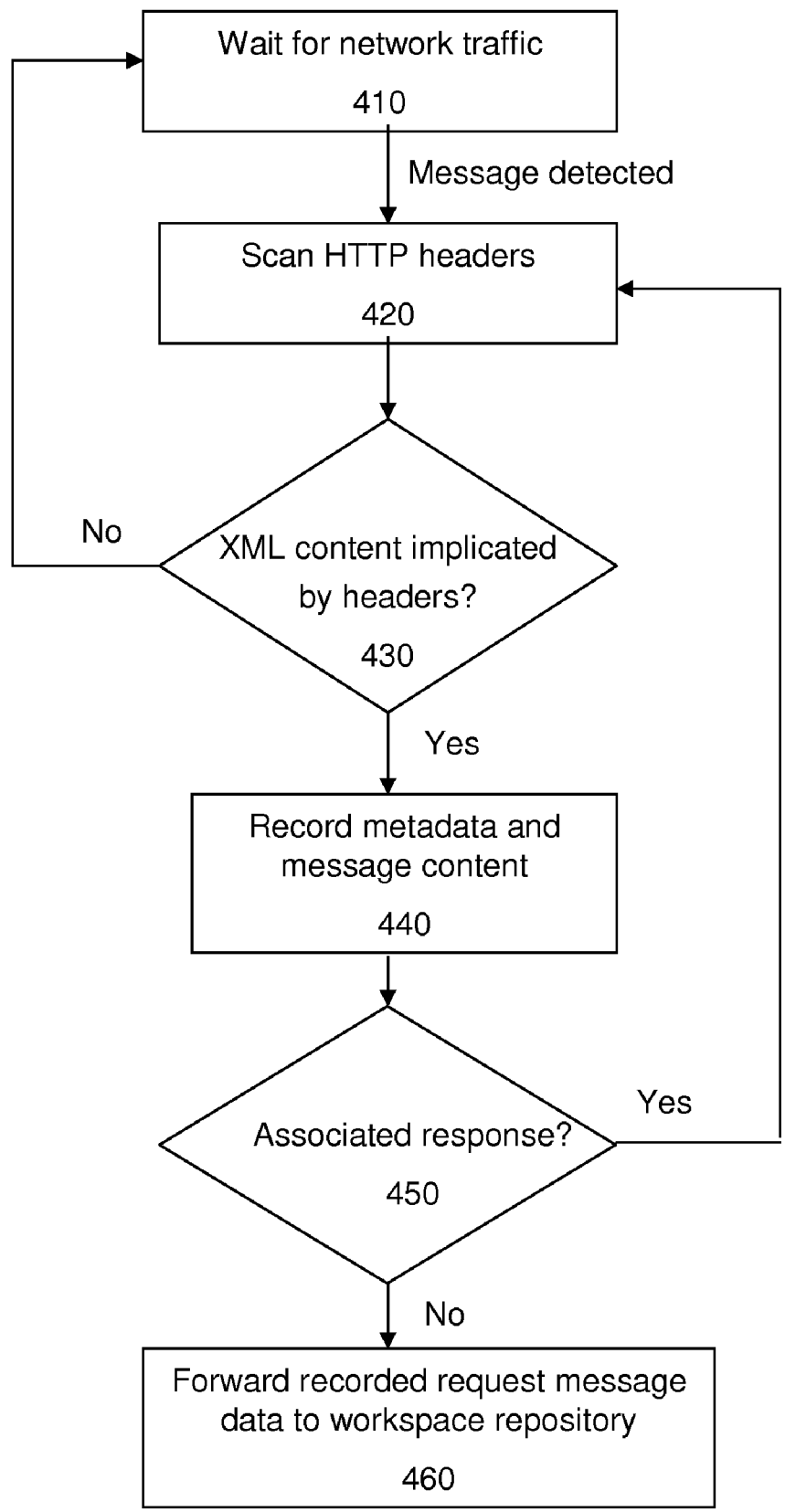
FIG. 4 is a more detailed process flow chart perspective illustrating the message capture process in accordance with one embodiment of the present invention.

Each time the collector detects a message, it follows the Message Capture process illustrated in FIG. 4. Initially, the Collector simply waits for network traffic 410. The Collector scans HTTP headers 420 searching for an indication that the message content contains XML. If there is no XML content, the system continues to wait for network traffic and scan the headers 430. When a request message containing XML content is detected 430, the Collector records the content of the message and any important metadata about the message, which may include such data as the time and duration of the message, the message sender's network address, the destination network address, and HTTP headers 440. Once a request message has been collected this way, the sniffer can watch for the associated response message 450 coming back from the service application to the client. If the collector detects such a response, it repeats the processing to scan the HTTP headers for XML content and record the message content and metadata. All the data is then forwarded to the Workspace Repository component to which the Collector is coupled 460.

The Collector component of the system serves the purpose of the message exchange data that occur in a web services scenario. In particular, the goal of the Collector is to obtain enough accurate data to reproduce the message exchange exactly as it occurred. Collector components may exist and operate in several forms and a few limited embodiments are described for illustrative purposes. The first two forms described herein, the Sniffer and the Proxy, serve the purpose of obtaining the "wire" level message exchange data. The third form, the Endpoint collector, serves to obtain data only available from within the client or service applications or their respective application containers.

One form the collector may take is as a "Sniffer". A sniffer is a software application running on a device coupled to the network that is able to passively collect the traffic that occurs over the network. This description will assume that the messages of interest are HTTP messages, but the same process can be applied to any messages sent over a physical network. A sniffer collector scans some or all network traffic on the network to which it is coupled typically using well-known TCP/IP packet capture technology.

According to one embodiment, a proxy may be used. A "Proxy" is another form that the Collector component may take, and instead of watching all network traffic, the proxy is a network application through which web service clients may be configured to direct their request messages. Every message sent in this way is scanned, filtered and forwarded to the Workspace Repository by the process described herein.

An "Endpoint" collector is another form for the web service client collector or the web service collector. An Endpoint collector may be deployed into a client or web service application, or into the application container that houses either of them (for example, using third-party "plugin" extensibility points within those applications). The endpoint collector can then use APIs within these applications to obtain notification of and data about messages being sent or received by them, and then sends these data to the workspace repository. Such APIs are common features of many web service clients, web services and application containers. For example, such an endpoint collector could capture message data before it is encrypted and sent out over the network; furthermore, it could also capture the post-encryption data and the encryption algorithm information by requesting these extra data from the application.

The workspace repository, on receiving these message data from one or more collectors, can then collate them into a complete, cross-sectional representation of a message. That is, if separate collectors collect various different data about the same, the workspace repository on receiving them can combine them into one encompassing view of this disparate data.

Another method for providing message exchange data to the Workspace Repository is via an Invoke component coupled to the Repository. Invoke allows an end-user to manually create web service requests and send them to a running web service application; the resulting message exchange data (the request and the response returned by the web service application) is then forwarded to the Workspace Repository. This message, created by the user via a GUI FIG. 5, can either be created "from scratch", or can be based on data from a message exchange provided to Invoke by the Workspace Repository to which it is coupled.

Referring again to FIG. 5, the GUI for the Invoke is displayed. The destination 510 is shown as a URL, however other destination identifiers are within the scope of the invention. There is an option to show the transport information 520, as well as an option to select the type of transport information such as XML. The header window 530 contains the header data associated with the destination. There may or may not be cookies 540 required to reproduce the problem. If authentication is established, there is an authentication feature 550 to enter the usename and password data or other authentication. A display window 560 displays the various data fields. Attachments 570 can be included so that the user can augment the amount of information available.

Figure 6:
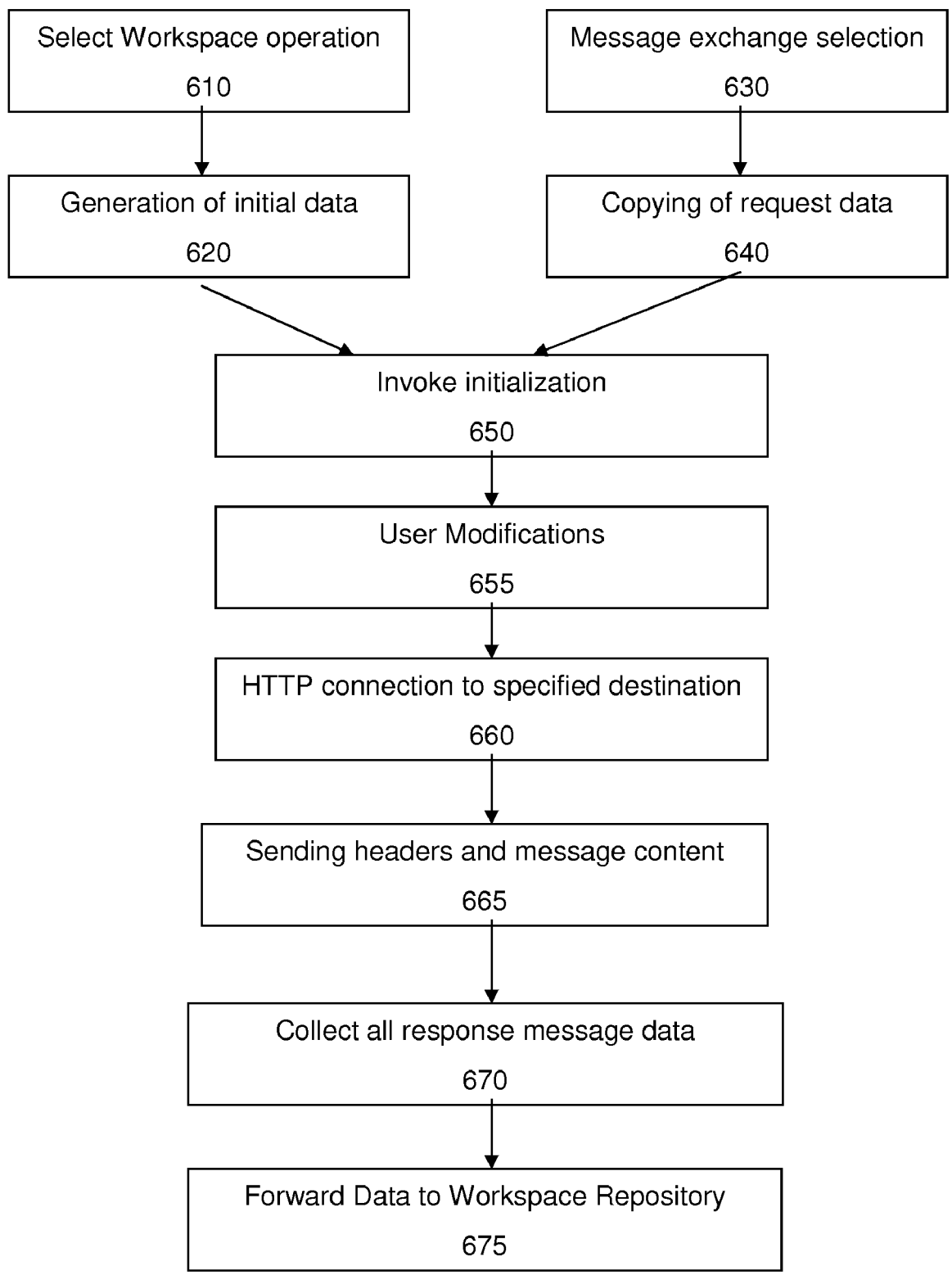
FIG. 6 shows the process flow chart perspective illustrating the invoking or resending of a single request message from a generated or captured message in a workspace.

Referring to FIG. 6, the process by which Invoke allows a user to send a message to the Workspace Repository. The user can select the Workspace operation from the WSDL closure 610, wherein the Invoke process 620 which generates the initial destination URL, HTTP headers, cookies, user authorization information and XML content using the data residing in the WSDL. The Invoke then initializes the GUI form with the data 650.

Alternatively, the user can select an existing message exchange 630 wherein the invoke copies the initial destination URL, HTTP headers, cookies, user authorization information and XML content from the request message. This Invoke then initializes the GUI form with the data as in the other embodiment 650.

Edits or modification by the user are permitted 655 in order to modify any of the fields. Once the data is approved, the user can 'send' the data for further processing.

The Invoke then opens an HTTP connection to the specified destination 660, and sends the HTTP header and message content 665. If the server sends a response, the present system collects all response message data 670. All of the request and possibly response data to the Workspace Repository component 675.

Figure 13:
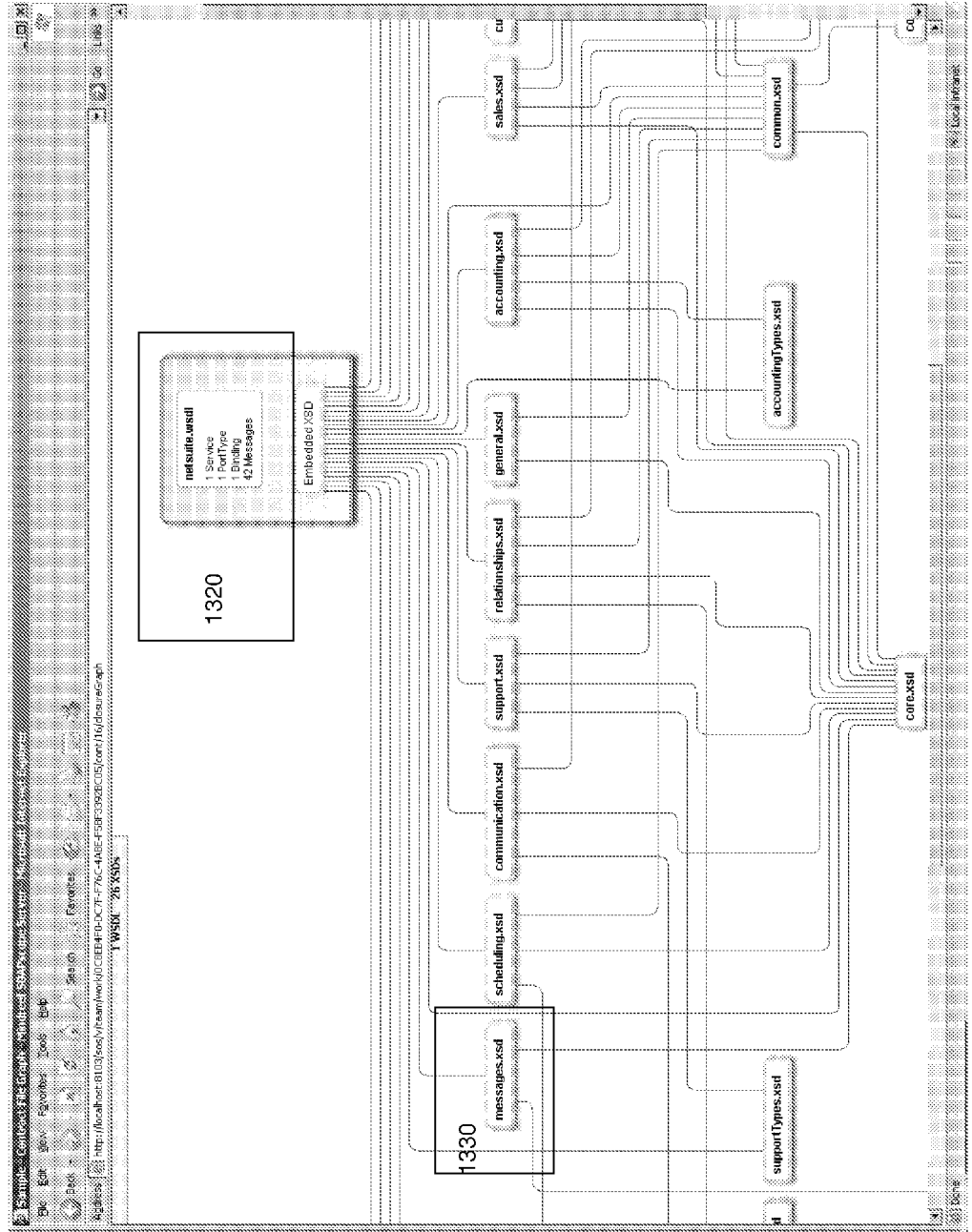
FIG. 13 is a graphical user interface screen display for a graphical view of a WSDL closure contained in the workspace in accordance with one embodiment of the present invention.

A WSDL closure represents a complete snapshot of a service description in time. The WSDL closure contains enough information to provide the system the ability to render both the documents, and the logical structure of the service description, to allow viewing and navigation at a variety of levels: physical document traversal, or logical composition, or raw information. Referring to FIG. 13, to aid in visualizing the present invention, FIG. 13 shows a logical view of a WSDL closure with both WSDLs 1320 and Schemas 1330 shown.

The name WSDL closure signifies two things: "WSDL" indicates that we begin with a reference to a WSDL document, and "Closure" implies that we follow and capture all reachable information, until we have all relevant information and no more is reachable, and the service description is 'closed', that is, there are no reachable parts we have not included. A WSDL Closure completely encapsulates the information available at the point in time at which the WSDL closure was built.

Applications for WSDL closure technology include, but are not limited to reproducing problems by generating new messages; duplicating an environment in a web server to replicate the exact conditions that existed when the WSDL closure was captured, which is possible because a WSDL Closure preserves a complete snapshot in time of what a code generating tool would see when generating a proxy from that WSDL; sophisticated analysis of a service; and server-side or client-side simulation.

Figure 7:
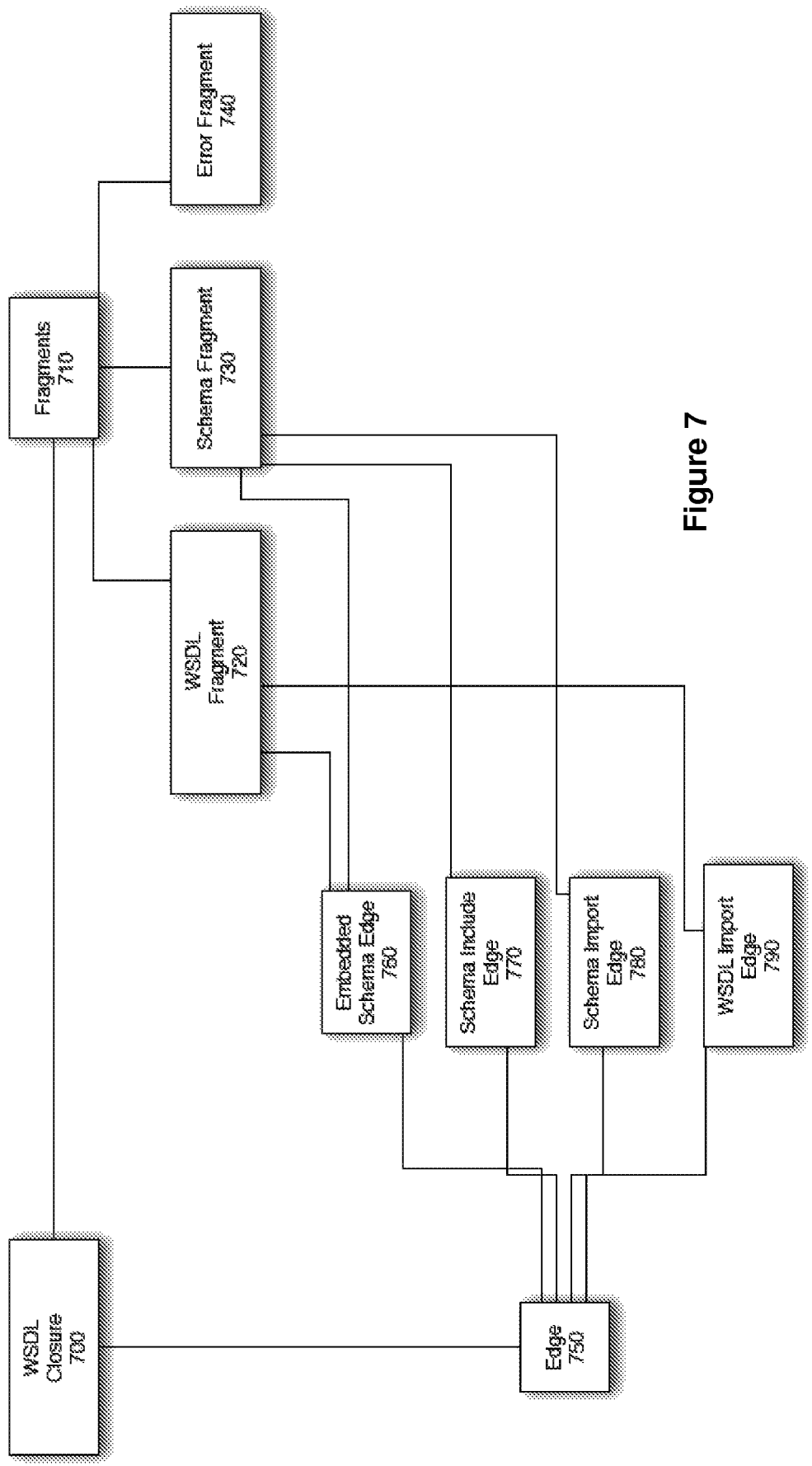
FIG. 7 is a simplified block diagram illustrating the structure of a WSDL closure produced by the WSDL closure construction process.

Referring to FIG. 7 to aid in visualizing relationships, A WSDL closure (700) contains WSDL documents, Schema documents as well as meta-information about their relation. Meta-information includes but is not limited to, the time the WSDL closure was built, and the starting location for the capture.

Documents are represented by fragments 710. Fragments are logical pieces of a service description, and one document may in fact contain many fragments. For instance, WSDL Documents may contain multiple schema sections, each of these sections is a logical piece of the service description.

Fragments may logically depend on other fragments, either by physical file reference, or by a explicit namespace dependency. WSDL closures represent fragment dependencies as Edges 750. Edges contain dependency information, including but not limited to dependency type, the dependent fragment (parent), the fragment depended upon (child), and the location in the parent fragment the dependency was declared.

WSDL Closures contain information about three types of fragments: WSDL 720 Fragments, Schema Fragments 730, and Error Fragments 740.

WSDL Fragments 720 represent the whole of a WSDL document. A WSDL document may reference other WSDL documents via an import mechanism, captured as a WSDL Import Edge 790. A WSDL document may contain multiple schema sections, these dependencies are captured as Embedded Schema Edges 760. The WSDL fragment maintains meta-information about the WSDL document, including but not limited to, document location, and target namespace.

Schema Fragments 730 represent either the whole of a Schema document, or a logical schema section embedded in a WSDL. A Schema may reference other Schema documents via an import mechanism, captured as an XSD Import Edge 780 or via an include mechanism, captured as an XSD Include Edge 770. A Schema fragment maintains meta-information about the Schema document or section, including, but not limited to, document location, and target namespace.

Occasionally, a document or logical component cannot be retrieved or is malformed in some way. WSDL closures capture this problem in Error fragments 740. Error fragments can represent file system or network failures that occur while capturing a document, due to packet loss, malformed location, non-existing location, or the Error fragment can represent documents that were malformed XML, or non-conformant to expected minimal structure.

Figure 8:
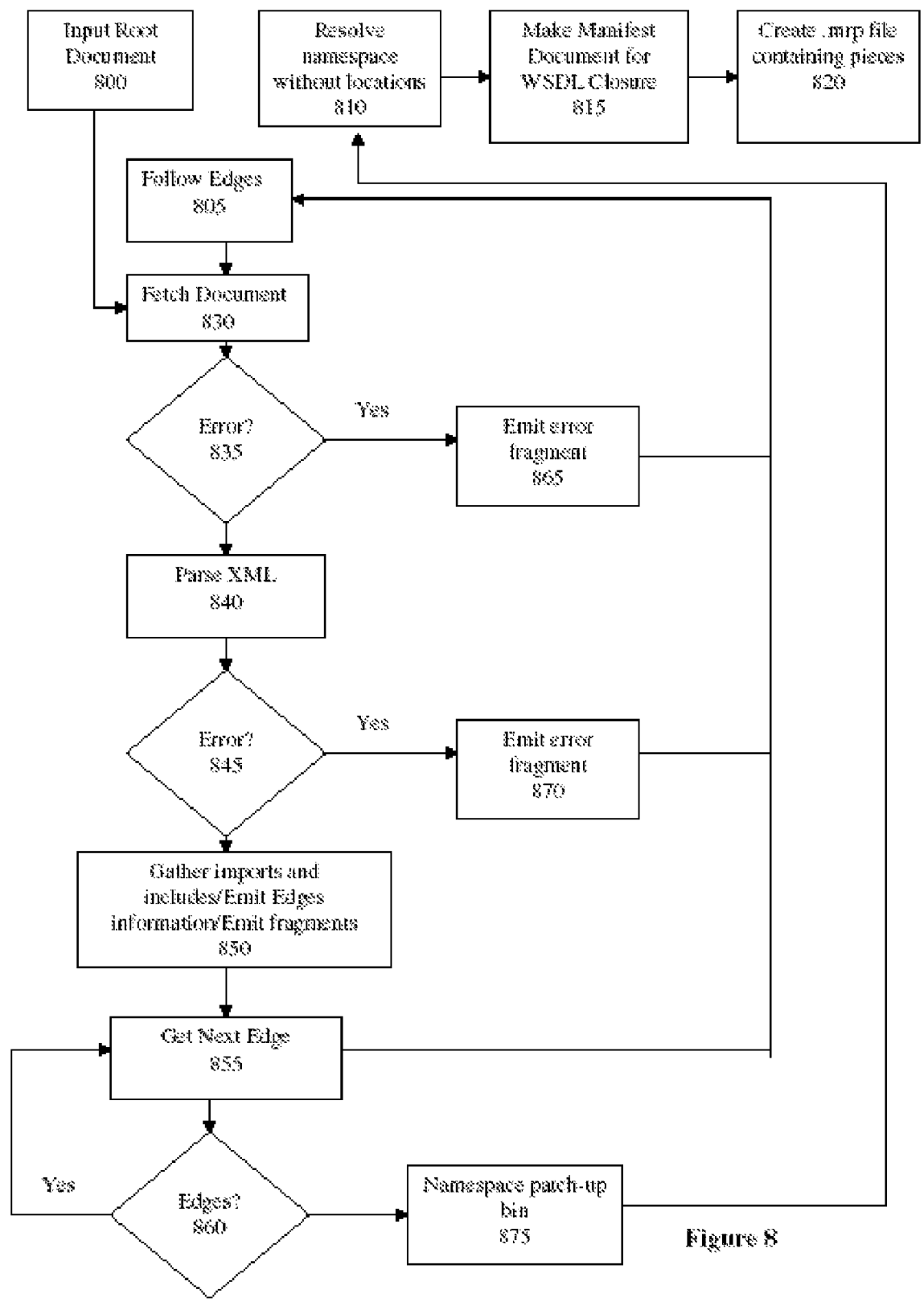
FIG. 8 shows the process flow chart perspective illustrating the construction of a WSDL closure from a input URL in accordance with one embodiment of the present invention.
Figure 11:
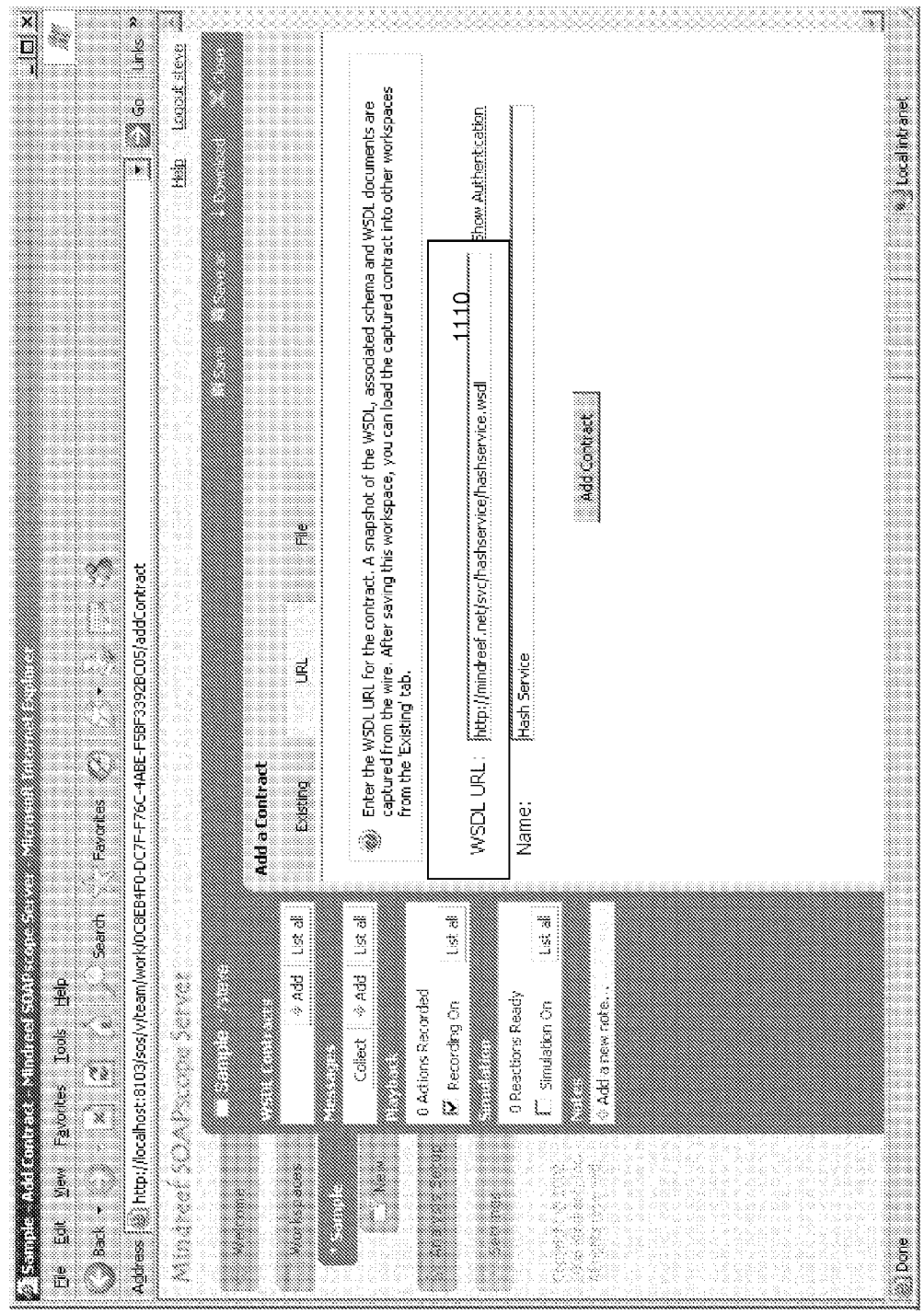
FIG. 11 is a graphical user interface screen display of the information provided to create and input a WSDL closure into a workspace by input of a URL in accordance with one embodiment of the present invention.

In order to create a WSDL closure, the system performs the following as illustrated in FIG. 8. The first step is to point at the root WSDL document 800 using either a network URL or a file URL. Referring to FIG. 11, to aid in visualizing the invention, the end-user can enter a URL by way of the GUI 1110 to begin the closure building process.

The Fetch Document 830 fetches the document from the location specified by the URL. Fetch Document maintains a list of documents it has fetched. If it is asked to fetch a document from the same location a document was previously fetched, it short-circuits so as not to perform undue processing. Otherwise, it attempts to fetch the document. If the document cannot be retrieved 835, the document is recorded as an Error fragment 865. Otherwise, the XML is parsed 840 and metadata is extracted. If the document cannot be parsed, or the metadata cannot be extracted 845 the document is recorded as an Error fragment 870.

During a successful parse, the system gathers information related to explicit import and includes mechanisms 850. The type of document determines the type of mechanisms to look for. If the document is a WSDL document, WSDL imports and schema sections are considered edges. If the document is a Schema document, schema imports and schema includes are considered edges.

The system then inspects the collected edges, one at a time. Each edge is Followed 805 in turn, and once an edge is followed, even if there is an error, the edge is removed from the unprocessed edge set. Preference is given to processing edges that contain explicit location information to the document they target. Edges that contain no explicit location information are deferred, until they are the only unprocessed edges remaining. The Follow Edges step 805 uses the system to repeat the process of fetching documents, parsing for errors or edges, extracting metadata, and following any remaining, un-followed, edges until the set of documents composing the service description is closed. It is closed, when there are no more edges to be followed.

A unique feature of the WSDL closure is the technique used to resolve imports that do not include a location attribute 875. When a location attribute is present, the system uses the location to find the typing and structure information related to that import. When no location is present, the system needs a way to resolve the typing and structure information for the namespace associated with the import. To do this, the WSDL closure contains a registry of all namespaces referred to in the document. When a namespace without a location attribute is encountered, the closure creation process resolves it to the first registry entry that matches the namespace and contains a location. The system contains a table of generally recognized or "known" namespaces and their locations. If a namespace without a location is not resolved in the registry previously described, the system attempts to resolve the namespace against the table of "well known" namespaces, such as the WSDL namespace, the Schema namespace, etc. If it is not possible to resolve the namespace, an error fragment is created.

Within the closure, a manifest is created 815 that contain a metadata regarding the fragments, as well as their data. It contains parent-child relation in the form of Edges and their metadata, as well as metadata regarding the closure as a whole (time of capture, etc).

As noted, the WSDL closure provides enough information to fully recreate the process by which a Web service client would have bound to a Service, either physically or virtually. For instance, a WSDL closure contains enough information to produce a logically equivalent set of documents to the original service description. This allows potential Web service clients to 'bind' to the service description, in the absence of the original service description. Further, it allows the system to make changes to the logically equivalent service description, such as retargeting the endpoint(s) the WSDL(s) specify.

Since the WSDL closure can produce a logically equivalent service description, the system is capable of creating virtual clients to the service, which drives Invoke, or to create a virtual server. The virtual server, as in Simulation, is capable of understanding the messages produced by any client of the original service description, or a logically equivalent service description produced by the system.

Users may create and modify workspaces using a GUI to the Workspace Repository that allows them to select from among these artifacts the ones they wish to include in a workspace.

Figure 9:
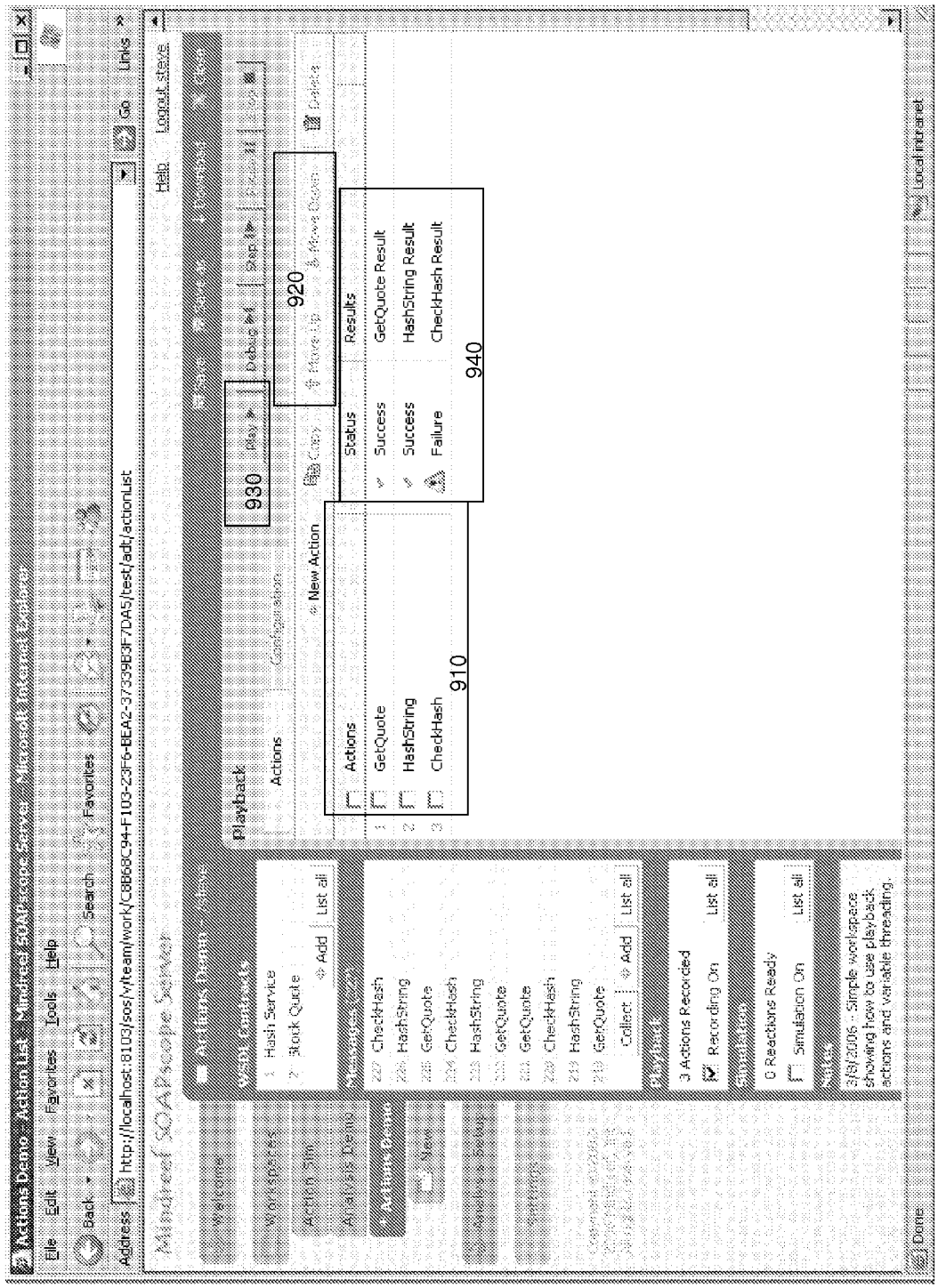
FIG. 9 is a graphical user interface screen display of the workspace showing a Playback script contained in the workspace in accordance with one embodiment of the present invention.

Referring to FIG. 9, to aid in visualizing the invention, The Workspace Repository can also allow users to resend a list of messages 910 in a more automated fashion. In a workspace, a user may choose some set of message exchanges with which to create a "Playback" script, also known as a test script. The request message from each exchange chosen by the user is copied into the list. In FIG. 9, in one embodiment the user automatically adds the last three messages generated by the Invoke component to the script. The user can then reorder 920 the list as desired and edit each request message exactly like when a message is edited in the resend process described above. In this case, the edited message is stored in place in the Playback script instead of being immediately sent over the network. The user may then choose to "play" 930 the list. The Workspace Repository then forwards each message in the Playback script, in order, to the Invoke component, which sends the message over the network, possibly receives the response, and forwards the resulting message exchange back to the Workspace Repository, as with manual resends described herein. The workspace may then compare the results 940 against the original result of the captured message, flagging differences in expectation. Expectation may be determined by literal comparison of response, but may also be guided by the user with explicit sections to ignore, or explicit sections to expect, to either static or variable data. In FIG. 9, the user has already "played" the list, and the workspace has captured the result messages, and flagged the third as "failed" since it did not match the expected response.

If the Workspace Repository is still coupled to the same network from which the message data were collected, and the web service application(s) are still running, then end users can use either individual or multiple resend to send the messages of interest to the same web service(s) to which the originally recorded messages were sent. As described above, this process allows the message to be sent again either exactly as it originally occurred, or after some modifications to the XML content or HTTP headers.

Alternatively, a workspace may have been exported from a Repository on one network and loaded into another instance of the Repository deployed on a different network. If a "staging" version of the service application(s), a version whose purpose is to aid development and testing but not production functionality, is involved in this workspace and exist on this latter network, then the user may choose to Resend some or all of the messages to the staging service(s), which may be in a different location than the original one. Because Collectors have captured the messages exactly as they appeared, this allows users to reproduce exactly the scenario that originally occurred, even in this different network location.

Figure 10:
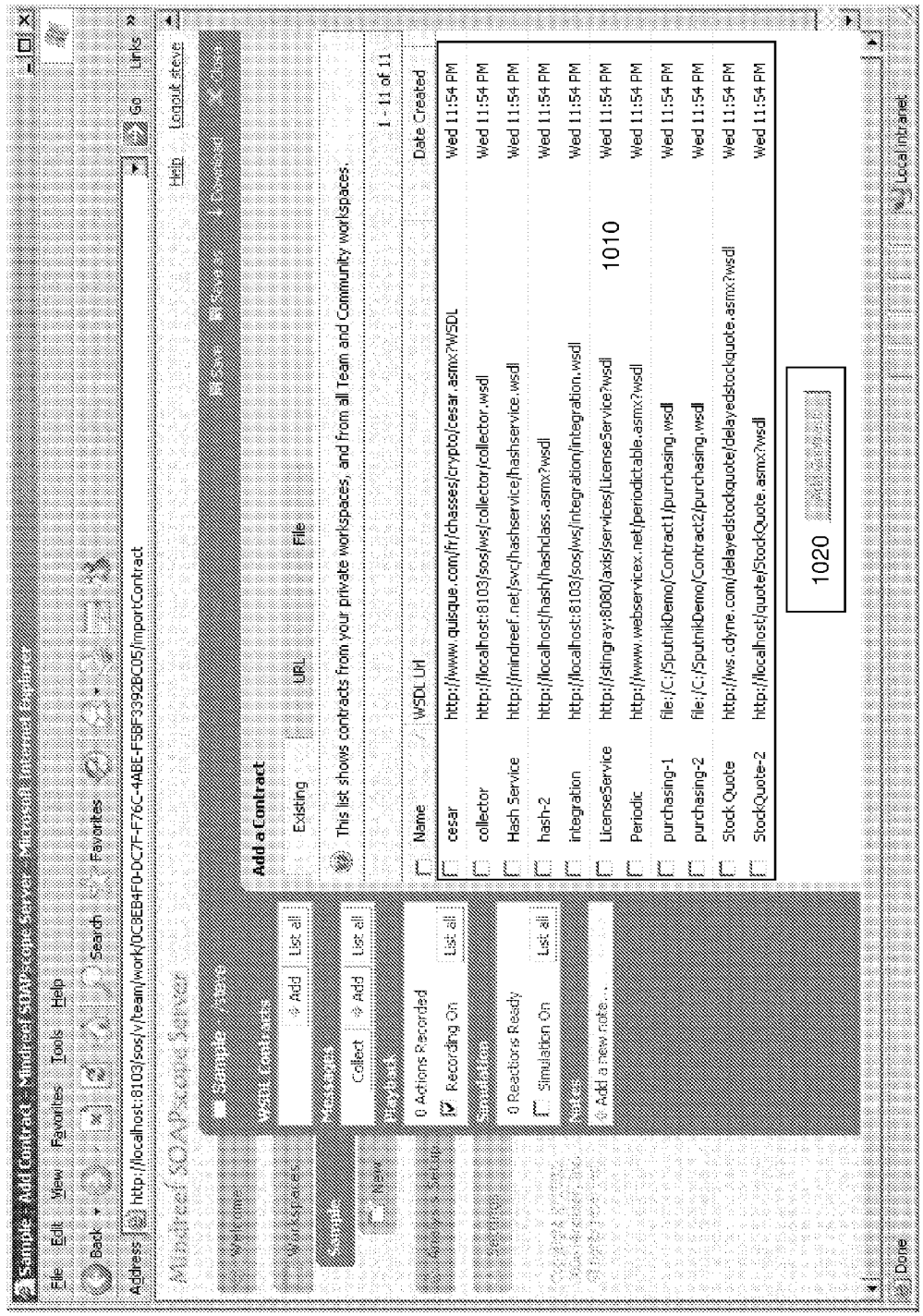
FIG. 10 is a graphical user interface screen display of the information provided to manage importing WSDL closure into a workspace in accordance with one embodiment of the present invention.

Referring to FIG. 10, to aid in visualizing the invention, any WSDL closures that have been collected 1010 by a WSDL Closure builder coupled to the Workspace Repository may be manually added 1020 to a workspace by the end-user by way of the GUI to the repository.

Referring again to FIG. 11, the end-user can enter a URL by way of the GUI 1110 to begin the closure building process for that URL at that specified time. A snapshot of the WSDL, associated schema and WSDL documents are captured at that time. The user can load a previously captured contract into other workspace as needed.

Figure 12:
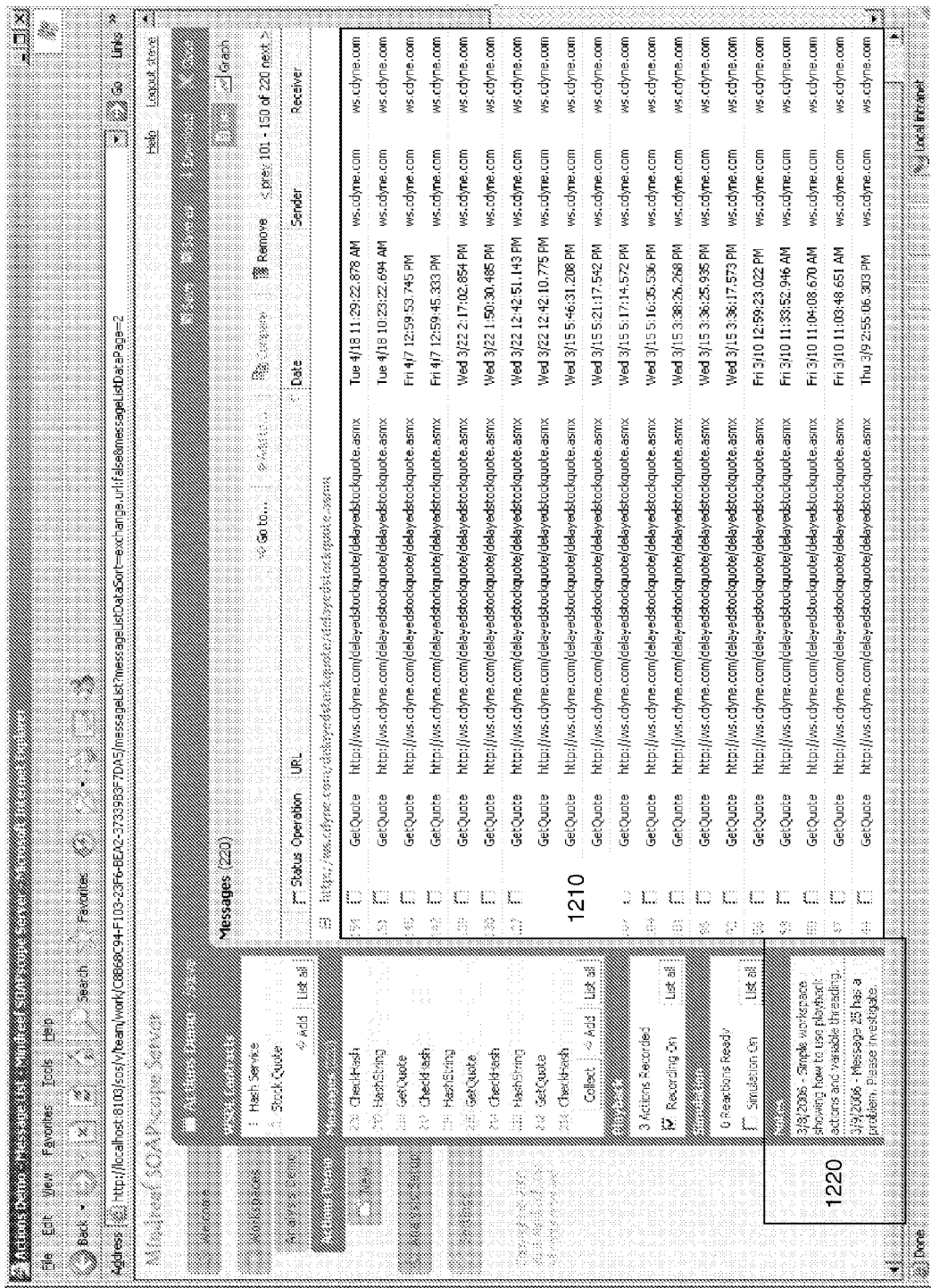
FIG. 12 is a graphical user interface screen display showing a list of collected, or generated, SOAP messages in the workspace in accordance with one embodiment of the present invention.

Referring to FIG. 12, any collected message exchanges 1210 collected by a Collector are coupled to the Workspace Repository, which may be manually added to a workspace by the end-user by way of the GUI to the repository. Descriptive notes 1220 may also be added to a workspace via this interface and may include various comments and suggestions.

Referring again to FIG. 13, FIG. 13 shows a logical view of a WSDL closure with an example of the netsuite.wsd1 1320 containing 1 service, 1 port type, 1 binding and 42 messages. The Schemas 1330 include the various XSD such as messages.xsd that form the WSDL.

As noted herein, the present invention provides a number of ways to fix problem or inefficient web services. It should be readily understood that a "problem" is not necessarily an issue that prevents functional operations. A problem can be any form of issue that does not provide optimal functionality, such as efficiency, speed, or even a potential problem that may arise under certain situations. Of course, it also includes more serious errors that may result in improper operations or complete lack of functionality.

The present invention provides the ability to easily view messages and WSDL in the context of the full situation. Further analysis can be safely preformed and other features can be used to highlight potential problems. After altering the client or service application to fix the problem, the present invention allows a test of the fix and the ability to reproduce the exact scenario to determine whether the fix is sufficient.

The ability to reproduce the problem also creates the ability to fix the problem. In particular, the present invention includes a set of tools that can debug the problems, allow a real time testing of the edited program, and the ability to retest the fixed program. In other embodiments, the problem can be dispatched to the developers to find a solution.

For illustration purposes of one embodiment, once a message has been captured, the invention provides the ability to edit and resend the message for repeated testing of a service. In addition to resending captured messages, it allows the user to manually create new messages using the Invoke/Resend capability for timely testing. The present invention thus simplifies the process of WS-I Basic Profile testing by allowing the user to run the WS-I Testing Tools with content generated and captured by for further analysis.

A further feature is the analysis tool, which includes an independent implementation of all the tests covered by the WS-I Basic Profile as well as those internally added and obtained from third party sources thereby forming a robust and growing database. The analyzer provides more specific details about the problems it finds than the WS-I testing tools, along with an interactive user interface that highlights where the problem occurs, and suggests possible solutions. The robust diagnostic and analytic tools for Web services empower developers with the ability to develop and maintain interoperable, quality Web services.

In one embodiment, one of the features of a collaborative web services support system is a set of workspaces that allow support teams and customers to work collaboratively on specific test, defect, or debugging scenarios. A workspace captures all relevant artifacts related to a web service including sequences of SOAP messages, WSDL, and schema documents. Support team members and customers can share workspaces with each other by using URLs that reference the workspace, or by saving copies of a workspace to a local file system. The resulting URL or file can then be shared with others using e-mail, problem tracking systems, and other means to provide a frame of reference around which problems can be worked in detail.

A further embodiment allows for a historical capture of a web service scenario regardless of whether there are errors. Such historical capturing and reproducibility allows for a replay at any future time for the web service scenario in the past.

The workspace files according to one embodiment of the invention offers tremendous possibilities for supporting web services. It documents problems, allows support teams to readily recreate problems in their debugging environment, provides sample data for QA teams to include in regression tests, and more. Problem reports can include attachments with detailed problem data, including actual messages captured from the wire and a captured description of the service. The captured description of the service is a collection of documents, beginning with the WSDL, and including all documents reachable from the WSDL. This set of all documents and their document dependencies, the WSDL Closure, removes any guesswork as to which version of a particular WSDL was used.

The present invention extends the concept of workspace sharing to the web with and allows support teams and customers to capture complex problem data in context and then publish that data online where it can be viewed using any standard web browser. In one embodiment this additional feature does not require any special plug-ins and is completely platform independent.

The support solution according to one embodiment helps organizations to successfully support web services by providing a powerful solution that provides a high level of customer satisfaction while lowering web services support costs through the creation of a more efficient and effective web services support environment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system providing a reproducible package of a web service scenario, comprising:
   at least one web service client device coupled to a network;
   a processor, coupled to said network, configured to provide at least one web service;
   a collector component, wherein said collector component is configured to extract a set of message exchanges between said web service client device and said web service, wherein said extracted set of messages includes a request message and an associated response message sent between said web service client device and said at least one web service;
   a closure builder component, wherein said closure builder component is configured to capture a complete snapshot of a service description at a specified time, said service description including at least one closure; and
   a workspace repository component coupled to said collector component and to said closure builder component, wherein said workspace repository component is configured to create and store said reproducible package of the complete and accurate data of said web service scenario, said reproducible package representing a problem context and comprising a set of message exchanges and corresponding service description and allowing for active reproduction at a later time of said web service scenario and said problem context and identification of errors therein,
   wherein said set of message exchanges includes said request message and said associated response message sent between said web service client device and said at least one web service.

2. The system according to claim 1, further comprising a web service invocation component coupled to said network and said workspace repository component, wherein said invocation component provides at least one invoked message exchange.

3. The system according to claim 1, wherein said collector component is selected from at least one of the group consisting of: network collector component, web service client collector component, and web service collector component.

4. The system according to claim 1, wherein said service description includes at least one of the group consisting of:
   WSDL documents, schema documents, and meta-information.

5. The system according to claim 1, wherein said reproducible package includes at least one of the group consisting of:
   WSDL closures, SOAP message exchanges, notes, simulation scripts and playback scripts.

6. The system according to claim 1, wherein said reproducible package is in a portable data format.

7. The system according to claim 1, wherein said specified time is about approximately a time frame that said collector extracts said set of message exchanges.

8. A computerized method for capturing message-based scenarios for distributed applications, comprising:
   establishing communications between at least one web service client and at least one web service;
   collecting message exchanges between said web service client and said web service that includes a request message and an associated response message sent between said at least one web service client and said at least one web service;
   capturing a complete snapshot of a service description of said distributed applications at a specific time, service description including at least one closure; and
   reproducing the complete and accurate data of a web service scenario from said message exchanges and said service description and allowing for active reproduction at a later time of said web service scenario and said problem context and identification of errors therein,
   wherein said snapshot includes a set of message exchanges including said request message and said associated response message sent between said web service client and said web service.

9. The method according to claim 8, further comprising storing at least one of said message exchanges, said service description and said web service scenario in a workspace repository.

10. The method according to claim 8, further comprising invoking a user-initiated message exchange and reproducing said web service scenario from said user-initiated message exchange.

11. The method according to claim 8, further comprising exporting said web service scenario in a portable data format.

12. The method according to claim 8, further comprising manipulating at least one of said message exchanges and said services description and reproducing a manipulated web service scenario.

13. The method according to claim 8, producing a logically equivalent service description for some portion of said service description.

14. A computerized method for collecting and communicating reproducible web service artifacts, the computerized method comprising:
- capturing a set of service description artifacts including at least one closure, wherein the set of service description artifacts includes a complete snapshot of a service description;
- collecting a set of message exchange artifacts between a web service client and a web service, wherein said set of message exchange artifacts includes a request artifact and an associated response artifact sent between said web service client and said web service;
- creating a workspace representing a problem context and comprising a set of message exchanges and corresponding service description from at least a portion of said set of service description artifacts and at least a portion of said set of messages exchange artifacts, wherein said workspace is a reproducible representation of the complete and accurate data of a web service scenario;
- allowing for active reproduction at a later time of said web service scenario and problem context and identification of errors therein; and
- sharing said workspace,
- wherein said set of message exchanges includes said request artifact and said associated response artifact sent between said web service client device and said web service.

15. The process according to claim 14, wherein said sharing is exporting the workspace as a portable data file.

16. The process according to claim 14, further comprising storing at least one of said service description artifacts and said message exchange artifacts in a relational database.

17. The process according to claim 14, further comprising manipulating said workspace.

\* \* \* \* \*